(12) United States Patent
Kawai et al.

(10) Patent No.: US 11,642,735 B2
(45) Date of Patent: May 9, 2023

(54) POWER SUPPLY SYSTEM, POWER SUPPLY DEVICE, AND CONTROL METHOD

(71) Applicant: DAIHEN Corporation, Osaka (JP)

(72) Inventors: Hirokazu Kawai, Osaka (JP); Songjie Hou, Osaka (JP); Futoshi Nishisaka, Osaka (JP); Haruhiko Manabe, Osaka (JP)

(73) Assignee: DAIHEN Corporation, Osaka (JP)

( * ) Notice: Subject to any disclaimer, the term of this patent is extended or adjusted under 35 U.S.C. 154(b) by 488 days.

(21) Appl. No.: 16/626,725

(22) PCT Filed: Apr. 16, 2018

(86) PCT No.: PCT/JP2018/015765
§ 371 (c)(1),
(2) Date: Dec. 26, 2019

(87) PCT Pub. No.: WO2019/008863
PCT Pub. Date: Jan. 10, 2019

(65) Prior Publication Data
US 2020/0122265 A1    Apr. 23, 2020

(30) Foreign Application Priority Data

Jul. 5, 2017   (JP) .............................. JP2017-131978

(51) Int. Cl.
*B23K 9/073*   (2006.01)
*B23K 9/095*   (2006.01)
(Continued)

(52) U.S. Cl.
CPC ............ *B23K 9/073* (2013.01); *B23K 9/0953* (2013.01); *B23K 9/1075* (2013.01); *H02M 3/335* (2013.01);
(Continued)

(58) Field of Classification Search
CPC ...... B23K 9/013; B23K 9/073; B23K 9/0953; B23K 9/0956; B23K 9/1012; B23K 9/1043; B23K 9/1062; B23K 9/1075
See application file for complete search history.

(56) References Cited

U.S. PATENT DOCUMENTS 4,595,820 A   6/1986   Richardson
5,061,841 A   10/1991  Richardson
(Continued)

FOREIGN PATENT DOCUMENTS

CN   1139308 A    1/1997
CN   105580261 A  5/2016
(Continued)

OTHER PUBLICATIONS

"Packet Communication Equipment and its Control Method, Otsuka, 2003" (Year: 2003).*
(Continued)

*Primary Examiner* — Brian W Jennison
*Assistant Examiner* — Abigail H Rhue
(74) *Attorney, Agent, or Firm* — Bret E. Field; Bozicevic, Field & Francis LLP

(57) ABSTRACT

A power supply system includes multiple power supply devices including a first power supply device and a second power supply device that are connected in common to a load. The first power supply device calculates control information for controlling voltage or current to be output to the load and source information for obtaining the control information, and controls the output to the load based on the calculated control information while transmitting the source information to the second power supply device. The second power supply device receives the source information transmitted from the first power supply device, calculates control information based on the received source information, and
(Continued)

controls the output to the load while detecting current to be output from itself to the load and transmitting current information to the first power supply device.

9 Claims, 14 Drawing Sheets

(51) Int. Cl.
 *B23K 9/10* (2006.01)
 *H02M 3/335* (2006.01)
 *H02M 1/00* (2006.01)
(52) U.S. Cl.
 CPC ...... *H02M 3/33573* (2021.05); *H02M 1/0009* (2021.05)

(56) References Cited

U.S. PATENT DOCUMENTS

| | | | |
|---|---|---|---|
| 5,796,601 A | 8/1998 | Yamamoto | |
| 6,291,798 B1 | 9/2001 | Stava | |
| 7,479,772 B2 | 1/2009 | Zane et al. | |
| 3,008,901 A1 | 8/2011 | Tang et al. | |
| 8,330,438 B2 * | 12/2012 | Sreenivas | H02M 3/1588 323/283 |
| 8,653,412 B2 | 2/2014 | Inada et al. | |
| 9,236,800 B2 | 1/2016 | Tang et al. | |
| 9,236,814 B2 * | 1/2016 | Kaneko | H02M 7/537 |
| 9,882,379 B2 * | 1/2018 | Yamada | H02J 7/34 |
| 9,960,676 B1 * | 5/2018 | Symonds | H02M 3/156 |
| 9,991,849 B2 * | 6/2018 | Dosaka | H04B 1/16 |
| 10,610,947 B2 | 4/2020 | Kawai et al. | |
| 2005/0023253 A1 | 2/2005 | Houston et al. | |
| 2005/0051524 A1 | 3/2005 | Blankenship et al. | |
| 2006/0203524 A1 | 9/2006 | Ohno et al. | |
| 2006/0239046 A1 * | 10/2006 | Zane | H02J 1/106 363/65 |
| 2011/0108536 A1 | 5/2011 | Inada et al. | |
| 2011/0309054 A1 | 12/2011 | Salsich | |
| 2013/0141952 A1 | 6/2013 | Kaneko | |
| 2015/0061392 A1 | 3/2015 | Berard | |
| 2015/0229225 A1 | 8/2015 | Jang et al. | |

FOREIGN PATENT DOCUMENTS

| | | | | |
|---|---|---|---|---|
| EP | 2752983 A1 | 7/2014 | | |
| JP | 2001-037217 A | 2/2001 | | |
| JP | 2001-129667 A | 5/2001 | | |
| JP | 3259308 B2 | 2/2002 | | |
| JP | 2003309623 A * | 10/2003 | | |
| JP | 2005-130599 A | 5/2005 | | |
| JP | 2006-116556 A | 5/2006 | | |
| JP | 2006-254669 A | 9/2006 | | |
| JP | 2009-148032 A | 7/2009 | | |
| JP | 2013-38864 A | 2/2013 | | |
| JP | 2016-208742 A | 12/2016 | | |
| JP | 6342274 B2 * | 6/2018 | ............... B23K 9/10 | |

OTHER PUBLICATIONS

"Welding System and Welding System Communication Method, Doi, 2014" (Year: 2014).*
English Translation of International Search Report for PCT Application No. PCT/JP2018/015765 dated Jun. 12, 2018.
Notice of Allowance for U.S. Appl. No. 16/097,099 dated May 19, 2021, 13 pages.
Extended European Search Report for European Application No. 18828387.3 dated Feb. 1, 2021, 11 pages.
English Translation of International Search Report for PCT/JP2017/019098 dated Jun. 27, 2017, 1 page.
Extended European Search Report for European Application No. 17815079.3 dated Feb. 10, 2020, 8 pages.
Office Action for U.S. Appl. No. 16/097,099 dated Jan. 29, 2021.

* cited by examiner

US 11,642,735 B2

POWER SUPPLY SYSTEM, POWER SUPPLY DEVICE, AND CONTROL METHOD

CROSS-REFERENCE TO RELATED APPLICATIONS

This application is the national phase under 35 U. S. C. § 371 of PCT International Application No. PCT/JP2018/015765 which has an International filing date of Apr. 16, 2018 and designated the United States of America.

FIELD

The present disclosure relates to a power supply system including multiple power supply devices that are connected in parallel to a common load, a power supply device constituting the power supply system, a control method and a control program.

BACKGROUND

Some machineries such as an arc welding machine, an arc cutting machine and so on require large current over 500-1000 amperes.

Japanese Patent Application Laid-Open No. 2001-129667 discloses a power source device configured to include multiple switching converter circuits for performing AC/DC conversion of commercial alternating current connected in parallel and to able to output large current to an arc welding machine. The switching converter circuits are controlled in operation by a single controller and constitute a single power supply as a whole. The controller detects current output and collected from the switching converter circuits and performs PWM control on the switching converter circuits such that the detected current matches target current.

SUMMARY

The power supply that is configured to output large current by a single device presents various problems such as the necessity of heat resistant design to withstand long hours of operation, a safety design and so on, and such a power supply is generally expensive.

Meanwhile, it may also be possible to connect existing multiple power supply devices parallel to a common load to thereby supply current from the power supply devices to the load. However, the power supply devices basically independently operate and are so controlled that the output current matches target current. This raises a problem of unstable current supply from the power supply devices to the load. For example, a welding load often varies from a short circuit load through an arc load to no load in a short time period, which causes continuous transient state of current.

It may also be possible to monitor current or the like output from the power supply devices connected in parallel to the load by utilizing an external control device to correct the operation of the power supply devices. This raises a problem of the cost of equipment required for introducing the external control device. In addition, the power supply devices continue to operate independently, which causes a problem of lack of stability of current output to the load.

It is an object to provide a power supply system including multiple power supply devices connected in parallel to a common load and being capable of stably controlling the current output from the power supply devices to the load without introducing an external control device with the power supply devices synchronized with each other, a power supply device constituting the power supply system, a control method and a control program.

A power supply system according to the present disclosure is a power supply system comprising a plurality of power supply devices including a first power supply device and a second power supply device, and the plurality of power supply devices are connected in parallel to a common load. The first power supply device includes a control information calculation unit that calculates control information for controlling voltage or current to be output to the load and source information for obtaining the control information, a control unit that controls voltage or current to be output to the load based on the control information calculated by the control information calculation unit, and a source information transmission unit that transmits the source information calculated by the control information calculation unit to the second power supply device. The second power supply device includes a source information reception unit that receives the source information transmitted from the first power supply device, a control information calculation unit that calculates control information for controlling voltage or current to be output to the load based on the source information received by the source information reception unit, a control unit that controls voltage or current to be output to the load based on the control information calculated by the control information calculation unit, a current detection unit that detects current output from the second power supply device to the load, and a current information transmission unit that transmits current information indicating the current detected by the current detection unit to the first power supply device. The first power supply device further includes a current information reception unit that receives the current information transmitted from the second power supply device, a current detection unit that detects current output from the first power supply device to the load, and a voltage detection unit that detects voltage output from the first power supply device to the load. The control information calculation unit calculates control information for controlling voltage or current to be output to the load and source information for obtaining the control information based on the current indicated by the current information received by the current information reception unit, the current detected by the current detection unit included in the first power supply device and the voltage detected by the voltage detection unit included in the first power supply device.

According to the present disclosure, the first power supply device and the second power supply device connected in parallel to the common load mutually communicate with each other, and the first power supply device controls the output of the overall power supply system. Accordingly, stable control of current output from the power supply devices to the load is made possible with the power supply devices synchronized with each other.

More specifically, the first power supply device calculates control information for controlling the output to the load and source information for obtaining the control information. The first power supply device controls the output of itself based on the calculated control information and transmits the source information to the second power supply device.

The second power supply device receives the source information transmitted from the first power supply device, calculates control information for controlling the output based on the received source information, and controls the output of itself based on the calculated control information. The second power supply device then detects the current output from itself to the load and transmits the current information to the first power supply device.

The first power supply device receives the current information transmitted from the second power supply device, and calculates control information and source information based on the current indicated by the received current information and the current and voltage detected by itself. The control information calculated here is information that is calculated based on the current and voltage output from the first power supply device and the second power supply device, and is capable of performing control of the output from the overall power supply system. The control information calculated from the source information is also information capable of controlling the output from the overall power supply system. The first power supply device and the second power supply device control the output based on the control information, so that the output from the respective power supply devices can be synchronized with each other, which prevents unstable current output from the respective power supply devices to the load and allows for stable control of the output.

Preferably, in the power supply system according to the present disclosure, the first power supply device and the second power supply device each include a display unit for indicating an operating state of the device of itself. The display unit of the first power supply device displays current obtained by summing the current detected by the first power supply device and the current indicated by the current information received by the current information reception unit and the voltage detected by the voltage detection unit if the first power supply device is operating. The display unit of the second power supply device displays predetermined information if the second power supply device is operating.

According to the present disclosure, on the display unit of the first power supply device performing control of the overall power supply system, the current and voltage that are being output from the power supply system to the load are displayed while on the display unit of the second power supply device, predetermined information is displayed.

Accordingly, by using the display unit of the first power supply device, the user can confirm the information about the current and voltage that are being output from the power supply system to the load. Meanwhile, by displaying the predetermined information on the display unit of the second power supply device, the user does not have to feel unnecessary confusion. For example, in the case where numerical values are displayed on both of the display units of the first power supply device and the second power supply device, the user intends to confirm the meaning of the numerical values displayed on the display units and the relationship between the values, which may provide unnecessary work load for confirmation. According to the present application, the voltage and the current are displayed on only the display unit of the first power supply device, which avoids imposing such unnecessary work load for confirmation on the user.

In the power supply system according to the present disclosure, it is preferable that the control unit of the first power supply device stops operating the first power supply device if the current information reception unit receives no current information.

According to the present disclosure, in the case where the first power supply device does not receive the current information that is supposed to be transmitted from the second power supply device, the first power supply device stops operation of itself assuming that abnormality occurs to the communication with the second power supply device. When the operation of the first power supply device is stopped, the operation of the second power supply device is also stopped. Accordingly, if abnormality occurs to the communication between the power supply devices, the overall power supply system is stopped to thereby ensure safety. Additionally, the power supply system can be protected.

In the power supply system according to the present disclosure, it is preferable that the first power supply device includes a determination unit that determines whether or not current indicated by the current information received by the current information reception unit is less than a predetermined threshold, and stops operating the first power supply device if the determination unit determines that the current is less than the threshold.

According to the present disclosure, in the case where the current output from the second power supply device is less than the threshold though the first power supply device outputs current from itself, the first power supply device stops operation of itself, assuming that abnormality occurs to the second power supply device. When the operation of the first power supply device is stopped, the operation of the second power supply device is also stopped. Accordingly, in the case where abnormality occurs to the output from the second power supply device, the overall power supply system can be stopped to thereby ensure safety. Furthermore, the power supply system can be protected.

It is noted that the threshold is a value for determining whether or not current is output from the second power supply device.

In the power supply system according to the present disclosure, it is preferable that the second power supply device comprises an abnormality information transmission unit that transmits abnormality information indicating presence or absence of abnormality for the second power supply device to the first power supply device, and the first power supply device comprises an abnormality information reception unit that receives the abnormality information transmitted from the second power supply device, and the control unit of the first power supply device stops operating the first power supply device depending on the abnormality information received by the abnormality information reception unit.

According to the present disclosure, the first power supply device receives abnormality information indicating the presence or absence of abnormality for the second power supply device and stops operation of itself depending on the operating state of the second power supply device. When the operation of the first power supply device is stopped, the operation of the second power supply device is also stopped. Accordingly, in the case where any abnormality occurs to the second power supply device, the overall power supply system can be stopped. For example, in the case where overcurrent occurs to the second power supply device, the overall power supply system can be stopped, which can ensure safety. Furthermore, the power supply system can be protected.

In the power supply system according to the present disclosure, it is preferable that the plurality of power supply devices supply power to a load concerning arc welding.

According to the present disclosure, the power supply system can supply large current to the load concerning arc welding.

In the power supply system according to the present disclosure, it is preferable that the source information includes total current obtained by summing the current indicated by the current information received by the current information reception unit and the current detected by the current detection unit included in the first power supply device and target current for the total current.

According to the present disclosure, the first power supply device transmits to the second power supply device source information including the total current to be output to the load from at least the first power supply device and the second power supply device and the target current. The second power supply device calculates control information for controlling the output of itself based on the total current and the target current included in the source information and controls voltage or current to be output to the load based on the calculated control information.

In the power supply system according to the present disclosure, it is preferable that the power supply devices each include an inverter for controlling voltage or current to be output to the load, the control unit controls voltage or current to be output to the load by outputting a pulse signal to the inverter, and the source information transmission unit transmits source information during an off time period of the pulse signal output by the control unit.

According to the present disclosure, the control unit of each of the power supply devices controls the voltage or current to be output to the load by outputting a pulse signal to the inverter. The pulse signal is a PWM signal, for example. Meanwhile, in the power supply system according to the present disclosure, multiple power supply devices are configured to transmit and receive to and from each other source information concerning control of power supply, which requires high-speed communication. Thus, communication may be made low resistant to noise due to difficulty in performing complex processing for improving the reliability of the communication.

Hereupon, the source information transmission unit of the first power supply device transmits source information to the second power supply device during the off-time period of the pulse signal. The source information is transmitted and received during the off time period of the pulse signal to thereby prevent noise caused by the operation of the inverter from being superimposed onto the source information, which allows for improvement in communication stability between the power supply devices. It is noted that synchronization between control on the inverter by the control unit and transmission of information by the source information transmission unit is a precondition.

In the power supply system according to the present disclosure, it is preferable that the current information transmission unit transmits current information during the off time period of the pulse signal output by the control unit.

According to the present disclosure, the current information transmission unit of the second power supply device transmits current information to the first power supply device during the off-time period of the pulse signal. Thus, it is possible to prevent noise caused by the operation of the inverter from being superimposed onto the current information and improve communication stability between the power supply devices.

In the power supply system according to the present disclosure, it is preferable that the first power supply device and the second power supply device transmit and receive information to and from each other through packet communication if outputting no voltage or no current to the load, and transmit and receive information to and from each other through non-packet communication for transmitting and receiving a predetermined amount of data if outputting voltage or current to the load.

According to the present disclosure, information is transmitted and received through non-packet communication during welding operation requiring high-speed communication. Meanwhile, information is transmitted and received through packet communication during non-welding operation not requiring high-speed communication. Hereafter, the communication mode performed during welding operation is called a "direct communication mode" while the communication mode performed during non-welding operation is called a "command communication mode."

In the direct communication mode during the welding operation, for example, the power supply devices transmit and receive to and from each other source information for controlling the voltage or current to be output to the load as a predetermined amount of data through non-packet communication. The predetermined amount of data is data of constant bit array, for example, 32-bit data. The information transmitted and received during the direct communication mode falls within the range of the predetermined amount of data. In the direct communication mode, the data amount to be dealt is small while data to be transmitted and received falls within the constant bit array, which enables high speed communication, providing robustness against the loss of data.

In contrast, during the non-welding operation, for example, during inching operation of the welding wire, the power supply devices transmit and receive information concerning feeding of a welding wire through packet communication. In the command communication mode during the non-welding operation, the power supply devices can each transmit and receive various types of information. The power supply device can discriminate the data in the command communication mode from the data in the direct communication mode with reference to the header information of a packet.

In the power supply system according to the present disclosure, it is preferable that the second power supply device transmits and receives information through the non-packet communication and switches a communication mode to the packet communication if the second power supply device does not receive the source information for a predetermined time period or longer.

In the case where the first power supply device and the second power supply device perform packet communication, that is, they are in the command communication mode, the reliability of the communication is high, and the first power supply device and the second power supply device can be switched to the direct communication mode corresponding to the non-packet communication without problem at the start of welding.

Meanwhile, in the case where the first power supply device and the second power supply device perform non-packet communication, that is, they are in the direct communication mode, they fails in communication at the end of welding, and the communication mode of the second power supply device may still perform non-packet communication though the communication mode of the first power supply device is switched to packet communication. However, in the case where the second power supply device receives no control information for controlling voltage or current to be output to the load for a predetermined time period or longer, that is, it is in the non-welding operation, the second power supply device according to the present disclosure actively switches the communication mode to the command communication mode. The case where no source information is received includes a situation where information concerning packet communication is being received, a situation where source information indicating zero output is being received and the like. Thus, the first power supply device and the second power supply device can surely switch the communication mode to the command communication mode at the end of welding.

In the power supply system according to the present disclosure, it is preferable that the control information calculation unit of the first power supply device corrects the control information concerning the first power supply device such that current to be output from the first power supply device to the load and current to be output from the second power supply device to the load are equalized based on the current indicated by the current information received by the current information reception unit and the current detected by the current detection unit included in the first power supply device, and the control information calculation unit of the second power supply device corrects the control information concerning the second power supply device such that current to be output from the first power supply device to the load and current to be output from the second power supply device to the load are equalized based on the source information received by the source information reception unit.

Due to variation in electric resistances of the power cables connecting the power supply devices to the load, variation in resistance inside the power supply devices, variation in connected electric resistance and so on, current actually output from the power supply devices to the load may vary from each other. When variation in current occurs, variation in temperature of the power supply devices under operation also occurs, which differentiates the lives of the power supply devices connected in parallel.

Hereupon, the control information calculation unit of the first power supply device so corrects the control information for controlling the output of the first power supply device as to reduce variation in current.

Likewise, the control information calculation unit of the second power supply device so corrects the control information for controlling the output of the second power supply device as to reduce variation in current.

Accordingly, it is possible to reduce the variation between the current output from the first power supply device and the current output from the second power supply device.

Furthermore, by correcting the control information of the first power supply device and the second power supply device in the same manner, the influence of the current output from the first power supply device and the second power supply device to the load on the total sum may be reduced to a minimum, and each of the control information may be corrected. Note that even if correction is made so as to vary the total sum of the current, the control information calculation unit calculates the control information and the source information such that the total sum of the current takes a required value, so that the current output to the load is not changed by the correction of the control information.

Since the first power supply device and the second power supply device control the output based on the control information thus calculated and corrected, this prevents unstable current output from the power supply devices to the load and variations in current from occurring, which allows for stable balance control of the output current.

A power supply device according to the present disclosure is a power supply device outputting voltage and current to a load, and comprises: a current detection unit that detects current output to the load; a voltage detection unit that detects voltage output to the load; a current information reception unit that receives current information indicating current output from a different power supply device to the load; a control information calculation unit that calculates control information for controlling voltage or current to be output to the load and source information for obtaining the control information based on the current indicated by the current information received by the current information reception unit, the current detected by the current detection unit and the voltage detected by the voltage detection unit; a control unit that controls voltage or current to be output to the load based on the control information calculated by the control information calculation unit; and a source information transmission unit that transmits the source information calculated by the control information calculation unit to the different power supply device.

According to the power supply device of the present disclosure, the above-mentioned power supply system is configured such that the output from its own power supply device and the output from the different power supply device are synchronized, thereby stably controlling the current output from the respective power supply devices to the load.

The power supply device according to the present disclosure comprises: a current information transmission unit that transmits current information indicating the current detected by the current detection unit to the different power supply device; a source information reception unit that receives source information transmitted from the different power supply device; and an operation unit that selects either one of a first control system controlling voltage or current to be output to the load by using the received current information as well as the detected voltage and current and a second control system controlling voltage or current to be output to the load by using the source information received by the source information reception unit. The control unit controls voltage or current to be output to the load based on the control information calculated by the control information calculation unit in a case where the first control system is selected, and the control information calculation unit calculates control information for controlling voltage or current to be output to the load based on the source information received by the source information reception unit, and the control unit controls voltage or current to be output to the load based on the calculated control information in the case where the second control system is selected.

According to the present disclosure, it is possible to select whether its own device functions as a first power supply device or a second power supply device by operating the operation unit of the power supply device. This makes it possible to prepare multiple power supply devices according to the present application and connect them in parallel, and cause one of the power supply devices to function as a first power supply device and another of the power supply devices to function as a second power supply device, which enables formation of the power supply system described above.

Any power supply device can be switched to function as a first power supply device or a second power supply device. Thus, even if a power supply device functioning as a first power supply device fails, one of the power supply devices functioning as a second power supply device is switched to function as a first power supply device, which enables reconstruction of the power supply system.

A control method according to the present disclosure is a control method of a power supply system comprising a plurality of power supply devices including a first power supply device and a second power supply device, the plurality of power supply devices connected in parallel to a common load, comprises: detecting current output from the first power supply device to the load and current output from the second power supply device to the load, and voltage output from the first power supply device to the load. The first power supply device calculates control information for controlling voltage or current to be output to the load from the first power supply device and source information for obtaining the control information, based on each detected current and detected voltage, and transmits the calculated source information to the second power supply device and controls voltage or current to be output to the load from the first power supply device based on the calculated control information. The second power supply device receives the source information transmitted from the first power supply device, calculates control information for controlling voltage or current to be output to the load based on the received source information, and controls voltage or current to be output to the load based on the calculated control information.

According to the control method of the present disclosure, the multiple power supply devices connected in parallel to the common load are synchronized, thereby enabling stable control of current output from the power supply devices to the load.

A control program according to the present disclosure is a control program causing a computer to control operation of a power supply device outputting voltage and current to a load. The control program causes the computer to execute the processing of obtaining current output to the load; obtaining voltage output to the load; obtaining current information indicating current output from a different power supply device to the load; calculating control information for controlling voltage or current to be output to the load by the power supply device and source information for obtaining the control information, based on each obtained current and obtained voltage; and transmitting the calculated source information to the different power supply device and controlling voltage or current to be output to the load based on the calculated control information.

The control program according to the present disclosure preferably causes the computer to execute the processing of transmitting current information indicating obtained current to the different power supply device; receiving source information transmitted from the different power supply device; calculating control information for controlling voltage or current to be output to the load based on the received source information; and controlling voltage or current to be output to the load based on the calculated control information.

According to the control program of the present disclosure, multiple power supply devices connected in parallel to the common load are synchronized, which achieves stable control of the current output from the power supply devices to the load.

According to the present disclosure, in the power supply system including multiple power supply devices connected in parallel to a common load, current output from the power supply devices to the load can stably controlled by synchronizing the power supply devices without introducing an external control device.

The above and further objects and features will more fully be apparent from the following detailed description with accompanying drawings.

DETAILED DESCRIPTION

The present disclosure will be described below with reference to the drawings depicting embodiments thereof.

Embodiment 1

Figure 1:
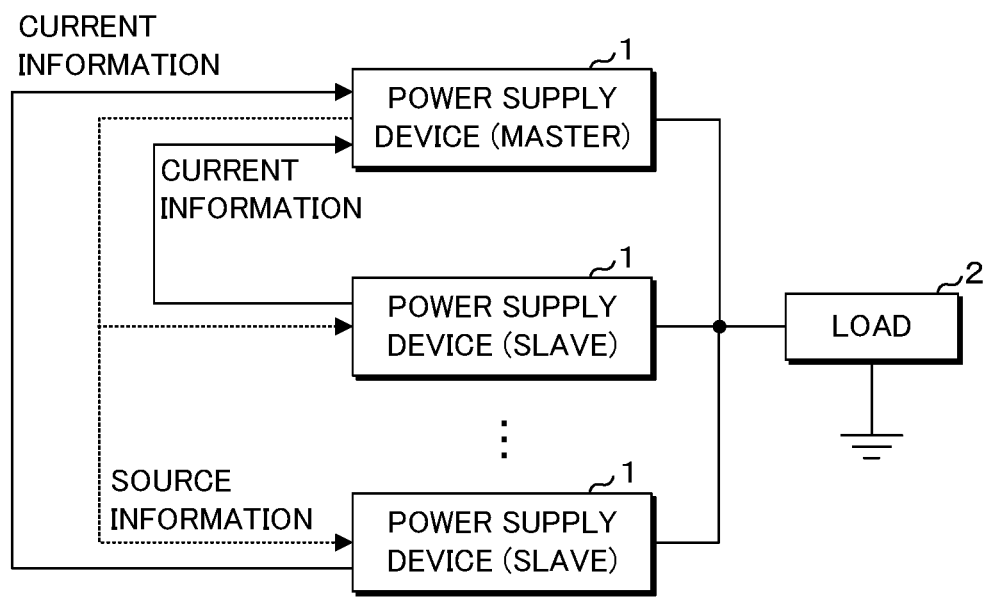
FIG. 1 is a block diagram illustrating one example of the configuration of a power supply system according to Embodiment 1.

FIG. 1 is a block diagram illustrating one example of the configuration of a power supply system according to Embodiment 1. The power supply system according to Embodiment 1 includes multiple power supply devices 1 that are connected in parallel to a common load 2 concerning arc welding and that supply power to the load 2. The power supply devices 1 are connected to each other through a communication line. Each of the multiple power supply devices 1 is an isolated switching power supply and converts alternating current (AC) to required direct current (DC) to supply the DC having been subjected to the AC/DC conversion to the load 2.

Note that the power supply devices 1 are power sources that have a constant-voltage characteristic and have the same standard and specification. For example, each of the power supply devices 1 has an external characteristic such that welding voltage decreases by 4 V to 20 V as the welding current of 100 A increases. When welding is performed at a predetermined welding condition with the external characteristic of each of the power supply devices 1 set as above, a welded section recessed on a base metal 22 is formed by heat of the arc, which facilitates maintenance of a buried arc welding state where the tip end of the welding wire 21 progresses into the space enclosed by the welded section. When arc welding is performed in a buried arc welding state, penetration of 25 mm per one pass on one surface is obtained, achieving welding a thick plate of metal by one pass welding.

One of the multiple power supply devices 1 functions as a master power supply that controls the output of each power supply device 1 by transmitting source information for obtaining PWM control information to another one of the power supply devices 1 through a communication line. Such another power supply device 1 functions as a slave power supply by receiving the source information transmitted from the one power supply device 1, calculating PWM control information based on the received source information, and controlling the output based on the calculated PWM control information. Hereafter, the power supply device 1 functioning as the master power supply is appropriately referred to as a first power supply device 1 while the power supply device 1 functioning as the slave power supply is appropriately referred to as a second power supply device 1. One or more second power supply devices 1 may be provided.

The second power supply device 1 detects current to be output from itself to the load 2 and transmits current information indicating the detected current to the first power supply device 1 through the communication line. The first power supply device 1 receives the current information transmitted from the second power supply device 1 and sums the current indicated by the current information and the current detected by itself to thereby calculate the total current to be output from the power supply system to the load 2. The first power supply device 1 then detects voltage to be output to the load 2 from itself and performs welding wavelength control computation based on the detected voltage and the total current, to calculate PWM control information for controlling the output from each of the power supply devices 1 constituting the power supply system and source information for obtaining the PWM control information. The source information includes, for example, the total current output from the power supply system to the load 2 and target current for the total current. The target current is different depending on required welding details, though not limited to a particular one, generally has a variable value. For example, the target current is a value varying at every several dozen microseconds. The first power supply device 1 controls the output of itself based on the PWM control information thus calculated, and controls the operation of each of the power supply devices 1 by transmitting the source information to the second power supply device 1 as described above.

The power supply devices 1 that are the same in standard and specification share the total current and target current in the whole system, so that output control may be synchronized, achieving welding control similarly to that performed by a single power supply.

Note that each of the power supply devices 1 may function as either one of the master power supply and the slave power supply by switching the operation mode. Furthermore, by switching the operation mode, each of the power supply devices 1 may also function as a single independent power supply device 1.

Figure 2:
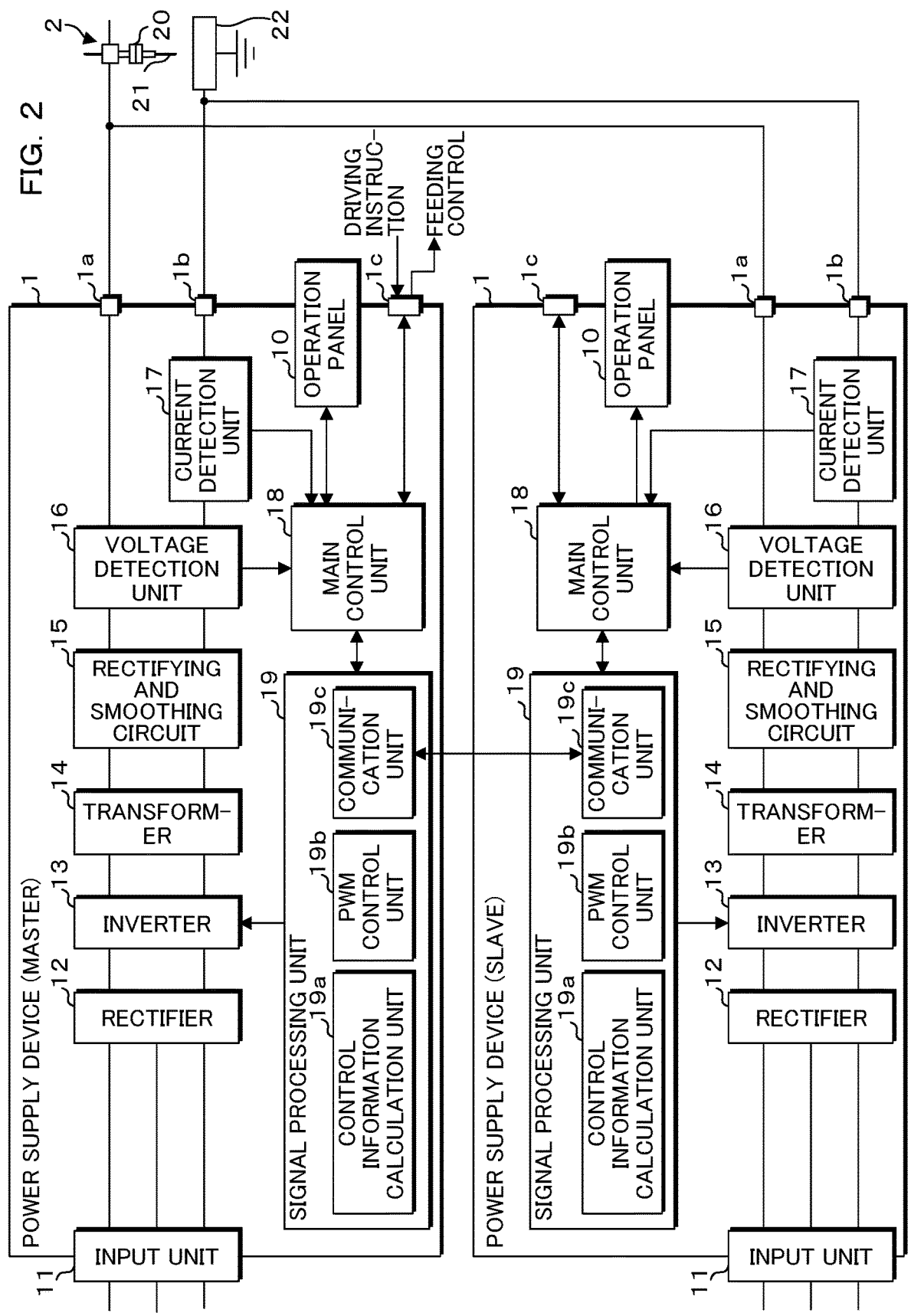
FIG. 2 is a block diagram illustrating one example of the configuration of power supply devices.

FIG. 2 is a block diagram illustrating one example of the configuration of the power supply device 1. Hereafter, description will be made assuming that the power supply system is formed by two power supply devices 1 including the first power supply device 1 and the second power supply device 1 in the interest of simplicity. The first power supply device 1 and the second power supply device 1 have the same configuration, and thus the configuration of one of the power supply devices 1 will mainly be described.

The power supply device 1 is provided with an operation panel 10, an input unit 11, a rectifier 12, an inverter 13, a transformer 14, a rectifying and smoothing circuit 15, a voltage detection unit 16, a current detection unit 17, a main control unit 18 and a signal processing unit 19.

The input unit 11 is an input terminal connected to a three-phase alternating current power supply (not illustrated), for example. The input unit 11 is connected to the rectifier 12, and inputs three-phase alternating current applied to the input terminal thereof to the rectifier 12.

The rectifier 12 is a diode bridge circuit, for example. The diode bridge has a circuit configuration having parallel-connected three series circuits each consisting of two forward-connected diodes (not illustrated). At the output terminal of the diode bridge circuit, a smoothing capacitor (not illustrated) is provided. The rectifier 12 applies full-wave rectification to alternating current (AC) input from the three-phase alternating current power supply via the input unit 11 and outputs direct current (DC) having been smoothed by the smoothing capacitor to the inverter 13.

The inverter 13 is a circuit for converting the DC having been rectified and smoothed by the rectifier 12 into AC of high frequency and outputting the resultant to the transformer 14. The inverter 13 is a full bridge circuit formed by four switching elements, for example. The full bridge circuit has a circuit configuration in which two legs each including two switching elements connected in series are connected in parallel. Each switching element is a power device such as an insulated gate bipolar transistor (IGBT), a metal-oxide-semiconductor field effect transistor (MOSFET) or the like.

The transformer 14 transforms the AC output from the inverter 13 and outputs the transformed AC to the rectifying and smoothing circuit 15. The transformer 14 has a primary coil and a secondary coil each of which is wound around the core and that are magnetically coupled to each other. The primary coil is connected to the inverter 13 while the secondary coil is connected to the rectifying and smoothing circuit 15.

The rectifying and smoothing circuit 15 is a circuit for rectifying and smoothing the AC output from the transformer 14. The rectified DC voltage and current are respectively output from a positive output terminal 1a and a negative output terminal 1b to the load 2. The rectifying and smoothing circuit 15 is formed by, for example, a full-wave rectifying circuit using a center tap, a smoothing circuit using a reactor or the like.

The load 2 is related to arc welding, for example, and includes a welding wire 21, a base metal 22, an arc generated by ionized shielding gas and so on. The positive output terminal 1a is electrically connected to the welding wire 21 through a positive-side power cable and a welding torch 20 while the negative output terminal 1b is connected to the base metal 22 through a negative-side power cable.

The voltage detection unit 16 is connected to the output side of the rectifying and smoothing circuit 15, for example, and is a circuit for detecting voltage to be output from its own device to the load 2 and outputting a voltage value signal indicating the detected voltage value to the main control unit 18.

The current detection unit 17 is provided on the output side of the rectifying and smoothing circuit 15, for example, and is a circuit for detecting current to be output to the load 2 from its own device and outputting a current value signal indicating the detected current value to the main control unit 18. The current detection unit 17 is, for example, a hall-typed current sensor provided with a magnetoelectronic conversion element such as a hall element or the like.

The main control unit 18, which includes a central processing unit (CPU), a read-only memory (ROM), a random-access memory (RAM), an interface and so on, is a processor for controlling the overall operation of the power supply device 1. The main control unit 18 is connected to a control terminal 1c at its interface. The control terminal 1c of the power supply device 1 functioning as a master power supply is connected to a control communication line of the welding machine, to which a driving instruction signal output from the welding machine is to be input. The main control unit 18 monitors the input state of a driving instruction signal, and outputs to the signal processing unit 19 a driving request for operating the inverter 13 if a driving instruction signal is input. Note that no driving instruction signal is input to the control terminal 1c of the power supply device 1 functioning as a slave power supply.

Furthermore, the main control unit 18 is connected, at its interfaces, to the voltage detection unit 16 and the current detection unit 17 from which a voltage value signal and a current value signal are input respectively. The main control unit 18 performs AD conversion on the input voltage value signal and current value signal and outputs voltage information and current information obtained by the AD conversion to the signal processing unit 19.

Moreover, the main control unit 18 is connected to the operation panel 10 and receives an input of a signal according to an operation performed on the operation panel 10. The main control unit 18 accepts an operation performed on the operation panel 10 by monitoring the signal. The main control unit 18 according to the present embodiment may accept selection of an operating mode of the power supply device 1 via the operation panel 10. The operation mode includes a master power supply mode (first control mode) that causes the power supply device 1 to function as a master power supply, a slave power supply mode that causes the power supply device 1 to function as a slave power supply (second control mode) and a single power supply mode that causes the power supply device 1 to function as a single power supply. Furthermore, the main control unit 18 causes the operation panel 10 to display an operating state for its own device by outputting to the operation panel 10 a display instruction signal for displaying various operating states such as an operating mode, output voltage, output current and the like of its own device.

In addition, the main control unit 18 of the power supply device 1 operating as a master power supply outputs a wire feeding control signal for controlling the feeding of the welding wire 21 in the welding machine from the control terminal 1c to the welding machine. It is noted that the power supply device 1 operating as a slave power supply does not output a wire feeding control signal.

The signal processing unit 19 is a digital signal processor (DSP) for outputting a PWM signal to switching elements constituting the inverter 13 and performing PWM control of turning ON and OFF of the switching elements, and includes a control information calculation unit 19a, a PWM control unit (control unit) 19b and a communication unit 19c. The signal processing unit 19 is connected to the inverter 13 and the main control unit 18 and receives an input of voltage information, current information, a driving request and so on that are output from the main control unit 18. The signal processing unit 19 stores the operating mode of its own device, and the details of signal processing depend on the operating mode of the power supply device 1. The details of signal processing will be described later.

The control information calculation unit 19a is a functional part to calculate PWM control information for controlling voltage or current to be output to the load 2 by controlling the operation of the inverter 13 and source information for obtaining the PWM control information. The PWM control information is information indicating the pulse width, pulse waveform and the like of a PWM signal to be output to the inverter 13. The source information is information including total current output from the power supply system to the load 2 and target current for the total current.

In the case where the operating mode is the single power supply mode, the control information calculation unit 19a calculates PWM control information for performing PWM control on the inverter 13 of its own device based on the voltage information and current information output from the main control unit 18, that is, the voltage and current detected by its own device.

In the case where the operating mode is the master power supply mode, the control information calculation unit 19a calculates PWM control information for performing PWM control on the inverters 13 of the first power supply device 1 and source information for obtaining PWM control information to perform PWM control on the inverters 13 of the second power supply device 1 based on the voltage information and current information of its own device output from the main control unit 18 and the current information concerning another power supply device 1. That is, the control information calculation unit 19a calculates the PWM control information and the source information based on the voltage and current detected by its own device and the current detected by another power supply device 1 serving as a slave power supply. Note that the current information detected by another power supply device 1 may be received by the communication unit 19c.

In the case where the operating mode is the slave power supply mode, the control information calculation unit 19a calculates PWM control information based on the source information transmitted from another power supply device 1 serving as a master power supply without calculating PWM control information by welding wavelength control computation as a master power supply.

The PWM control unit 19b is a functional part for generating a PWM signal having a required pulse width and a pulse waveform by using the PWM control information and outputting the generated signal to the inverter 13. The PWM control unit 19b alternately switches the switching elements of the full bridge circuit crosswise between ON and OFF to thereby output AC from the inverter 13.

In the case where the operating mode is the single power supply mode or the master power supply mode, the PWM control unit 19b generates a PWM signal by using the PWM control information calculated by the control information calculation unit 19a of its own device.

In the case where the operating mode is the slave power supply mode, the PWM control unit 19b generates a PWM signal by using the PWM control information calculated based on the source information calculated by another power supply device 1. The source information calculated by another power supply device 1 may be received by the communication unit 19c. If its own device and another power supply device 1 have the same output capacitance, the PWM signal of its own device and the PWM signal of another power supply device 1 are substantially the same as a result. If the output capacitances are different from each other, the PWM control unit 19b generates a PWM signal for which the difference between the output capacitances is corrected by using the source information calculated by another power supply device 1. In this case, the PWM signal of its own device and the PWM signal of another power supply device 1 are different from each other.

The communication unit 19c is a communication circuit for transmitting and receiving various types of information to and from another power supply device 1. The communication unit 19c transmits and receives information according to the host control interface (HCI) communication standard, for example.

In the case where the operating mode is the master power supply mode, the signal processing unit 19 transmits operating information indicating the operating state of the inverter 13 of its own device and the source information calculated by the control information calculation unit 19a to another power supply device 1 operating in the slave power supply mode via the communication unit 19c. The power supply device 1 serving as a slave power supply receives by the communication unit 19c the operating information and the source information that are transmitted from the power supply device 1 operating in the master power supply mode.

In the case where the operating mode is the slave power supply mode, the signal processing unit 19 transmits to the power supply device 1 operating in the master power supply mode via the communication unit 19c current information indicating the current being output to the load 2 from its own device, operating information indicating the operating state of the inverter 13 of its own device and abnormality information indicating the presence or absence of abnormality of its own device. The abnormality information is information indicating, for example, excessive current, abnormal stop or the like. The power supply device 1 serving as a master power supply receives the current information, the operating information and the abnormality information that are transmitted from the power supply device 1 operating in the slave power supply mode by the communication unit 19c.

Figure 3:
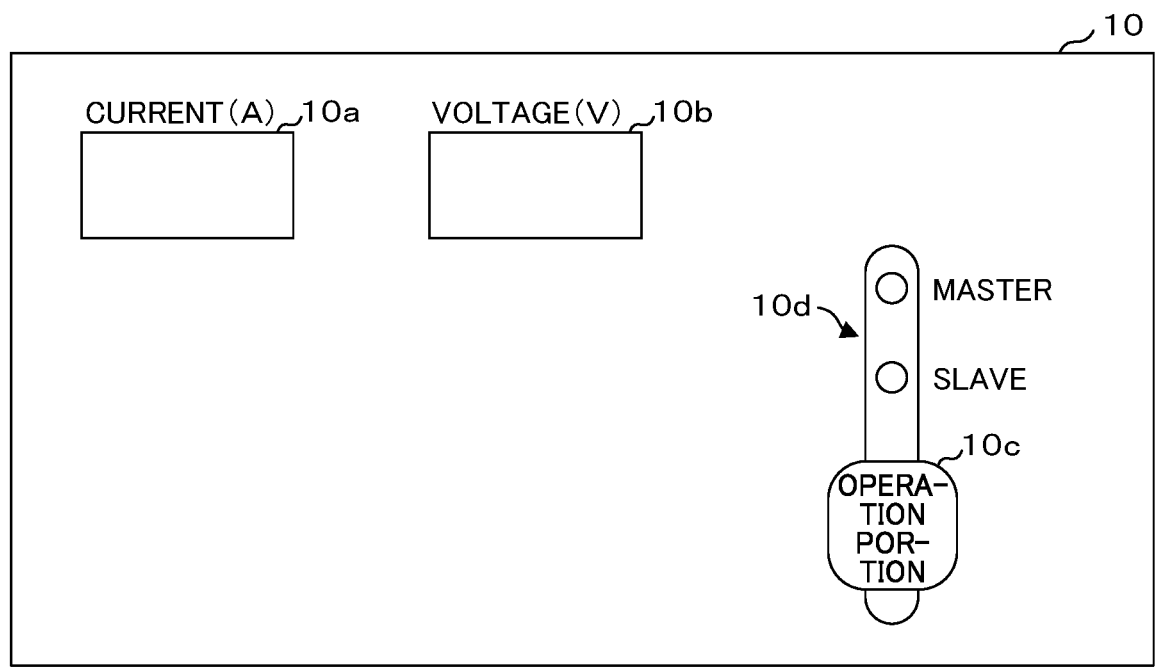
FIG. 3 is a schematic view illustrating one example of the configuration of an operation panel.

FIG. 3 is a schematic view illustrating one example of the configuration of the operation panel 10. The operation panel 10 includes a current display portion (display portion) 10a and a voltage display portion (display portion) 10b for respectively displaying current and voltage that are being output to the load 2.

In the case where the operating mode is the master power supply mode, the main control unit 18 causes the current display portion 10a to display the value of the total sum of the current obtained by summing the current that is being output from the power supply devices 1. Furthermore, the main control unit 18 causes the voltage display portion 10b to display the value of the voltage obtained by detection in its own device (see FIG. 6A). In the case where the operating mode is the slave power supply mode, the main control unit 18 causes the current display portion 10a and the voltage display portion 10b to display predetermined information indicating that its own device is being driven (see FIG. 6B). The predetermined information is text information such as "DRIVING," "RUN" or the like, though the details of the information to be displayed is not limited to a specific one. Such a configuration may be included that display pixels or display segments constituting the current display portion 10a and the voltage display portion 10b are entirely lit up or put out. In the case where the operating mode is the single power supply mode, the main control unit 18 causes the current display unit 10a and the voltage display unit 10b to display the values of current and voltage that are being output from its own device.

Moreover, the operation panel 10 includes an operation portion 10c for switching the operating mode of the power supply device 1 and an operating mode display portion 10d for displaying the present operating mode of its own device. The operation portion 10c is, for example, a sealed tactile switch, a pushbutton switch or the like. The main control unit 18 of the power supply device 1 switches the present operating mode to another operating mode when the operation portion 10c is operated. For example, the signal processing unit 19 stores the present operating mode, and the main control unit 18 switches the operating mode of the signal processing unit 19 by outputting a mode switching instruction to the signal processing unit 19. The operating mode is switched among the single power supply mode, the master power supply mode, the slave power supply mode and the single power supply mode . . . in this order, for example, every time the operation portion 10c is operated.

The operating mode display portion 10d includes multiple light-emitting elements. The multiple light-emitting elements include a light-emitting element that lights up in the case of the master power supply mode and a light-emitting element that lights up in the case of the slave power supply mode, for example.

The control method and the operation of the power supply system will be described below.

Figure 4:
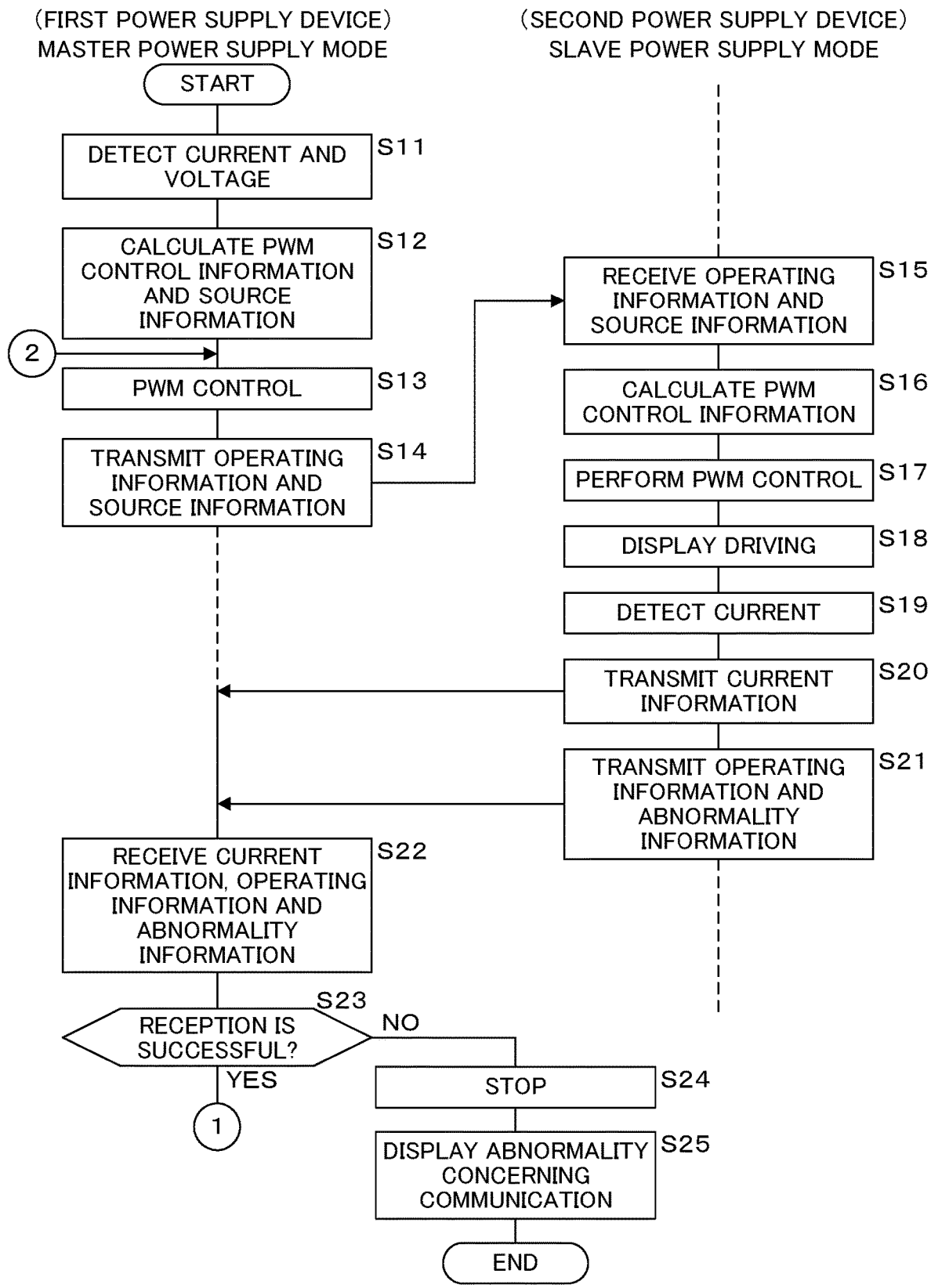
FIG. 4 is a flowchart illustrating the processing procedure of each of the power supply devices concerning power feeding control.
Figure 5:
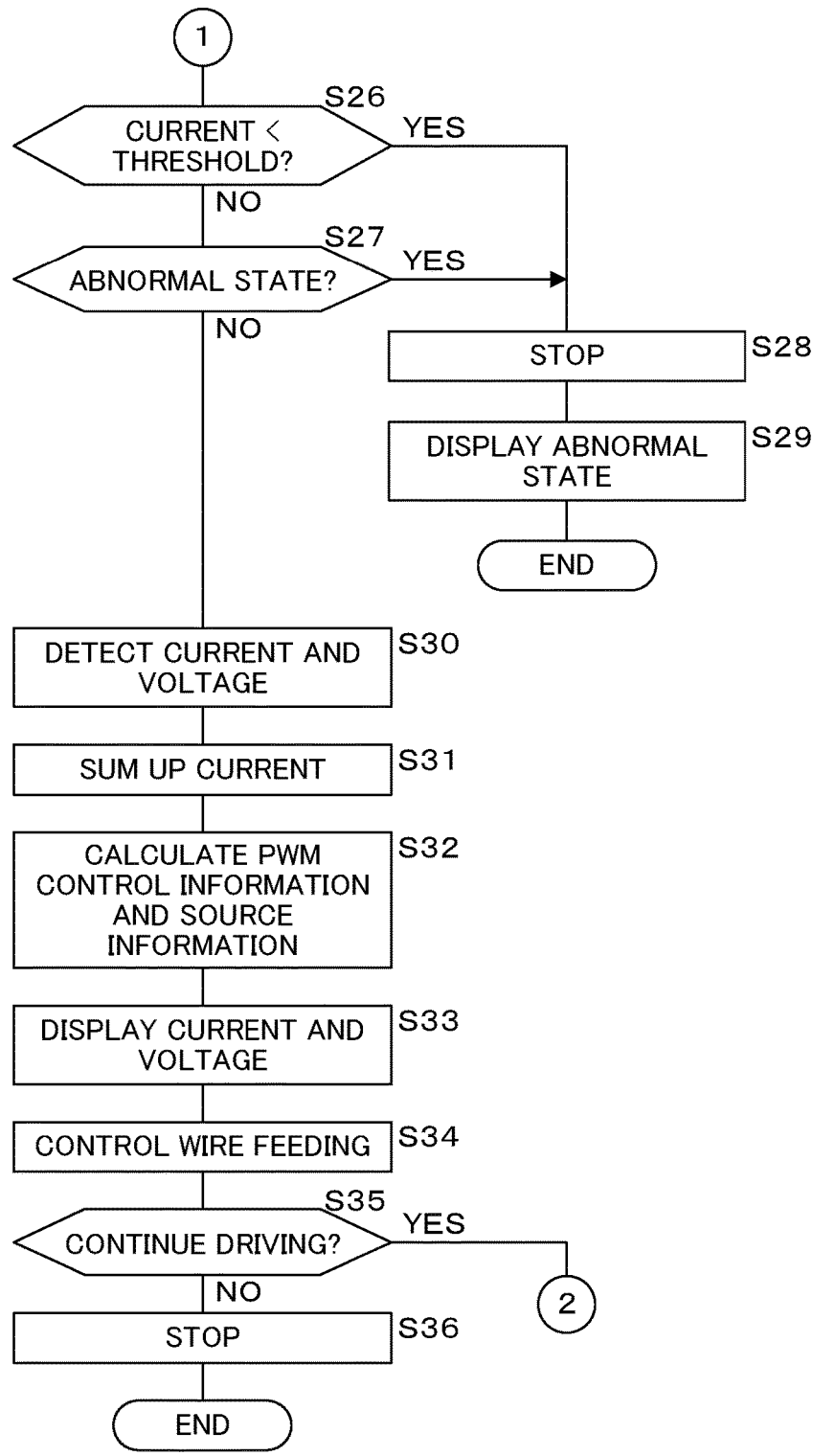
FIG. 5 is a flowchart illustrating the processing procedure of each of the power supply devices concerning power feeding control.
Figure 6A:
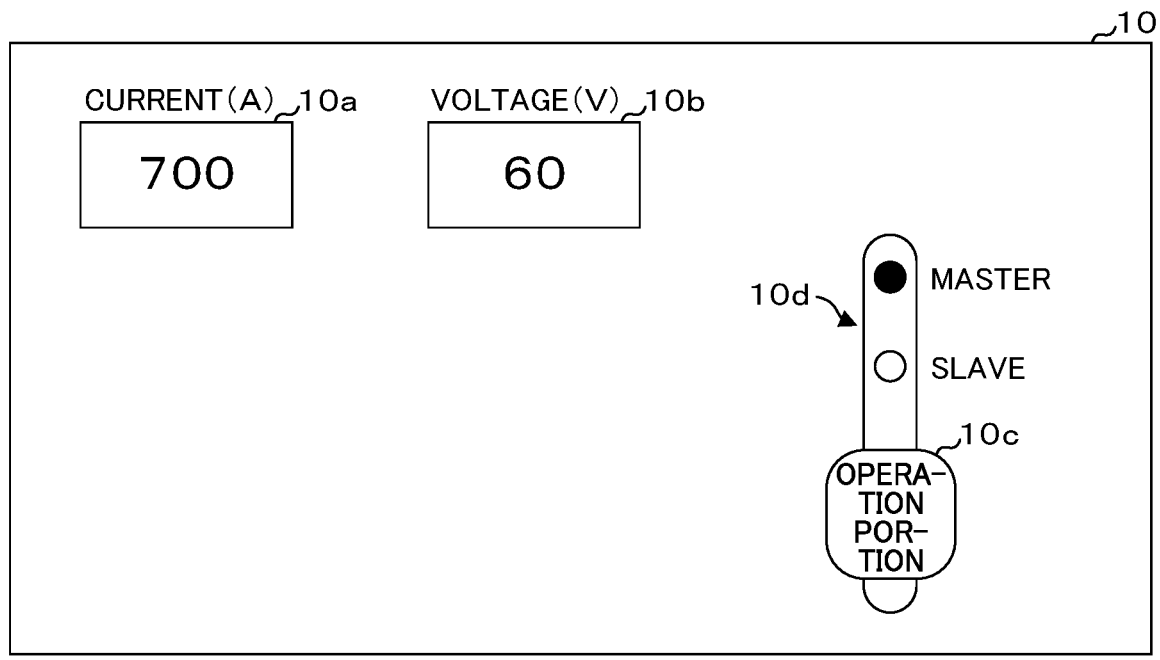
FIG. 6A is a schematic view illustrating a display example of an operating state.
Figure 6B:
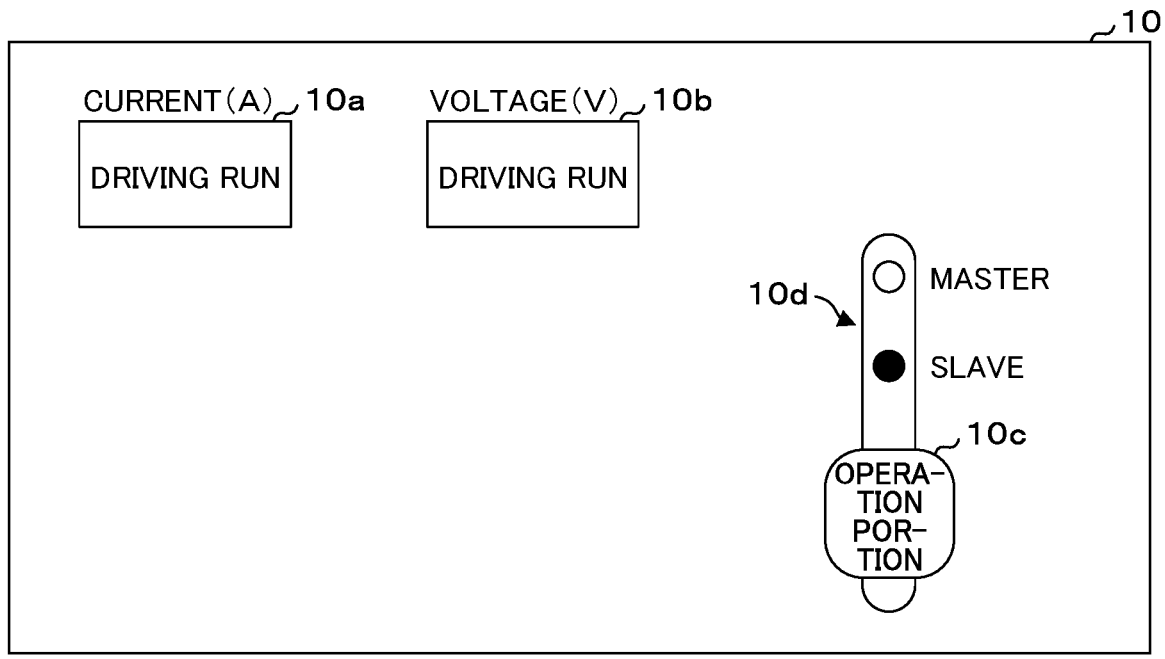
FIG. 6B is a schematic view illustrating a display example of an operating state.

FIG. 4 and FIG. 5 are flowcharts illustrating the processing procedure of the power supply devices 1 concerning power feeding control. FIG. 6A and FIG. 6B are schematic views illustrating display examples of the operating states. The processing of the first power supply device 1 operating in the master power supply mode and the second power supply device 1 operating in the slave power supply mode will be described here. Furthermore, FIG. 6A depicts the operation panel 10 of the power supply device 1 in the master power supply mode while FIG. 6B depicts the operation panel 10 of the power supply device 1 in the slave power supply mode.

In the case where a driving instruction signal is input to the first power supply device 1 serving as a master power supply, the main control unit 18 detects the current and voltage that are being output from its own device to the load 2 by the current detection unit 17 and the voltage detection unit 16, respectively (step S11). The main control unit 18 outputs the current information and voltage information obtained by detection to the signal processing unit 19.

The signal processing unit 19 in the master power supply mode calculates PWM control information and source information by performing welding wavelength control computation based on the current and the voltage respectively indicated by the current information and the voltage information (step S12). Upon activation, the power supply device 1 serving as a slave power supply has not yet started its operation and thus calculates PWM control information and source information using the current and voltage detected by the first power supply device 1, for example.

The signal processing unit 19 in the master power supply mode then performs PWM control on the inverter 13 based on the calculated PWM control information (step S13). Subsequently, the signal processing unit 19 transmits operating information indicating the operating state of the inverter 13 and the source information to the second power supply device 1 serving as a slave power supply via the communication unit 19c (step S14). The operating information is, for example, information indicating whether or not the inverter 13 is being driven.

The signal processing unit 19 in the slave power supply mode receives the operating information and the source information that are transmitted from the first power supply device 1 by the communication unit 19c (step S15). Next, the signal processing unit 19 in the slave power supply mode confirms that the master power supply is being driven based the operating information and calculates PWM control information based on the received source information (step S16)

and performs PWM control on the inverter 13 of its own based on the calculated PWM control information (step S17).

Note that the communication unit 19c that performs the transmission at step S14 corresponds to a source information transmission unit while the communication unit 19c that performs the reception at step S15 corresponds to a source information reception unit.

Subsequently, the main control unit 18 of the second power supply device 1 causes the operation panel 10 to display that it is being driven if its own device is normally operating (step S18). As illustrated in FIG. 6B, for example, the main control unit 18 causes the current display portion 10a and the voltage display portion 10b to display that its own device is being driven.

Next, the main control unit 18 of the second power supply device 1 detects current that is being output from its own device to the load 2 by the current detection unit 17 (step S19). The main control unit 18 outputs the current information obtained by detection to the signal processing unit 19.

The signal processing unit 19 in the slave power supply mode transmits the current information detected by its own device to the first power supply device 1 serving as a master power supply via the communication unit 19c (step S20). Furthermore, the signal processing unit 19 transmits operating information indicating the operating state of the inverter 13 of its own device and abnormality information indicating the presence or absence of abnormality to the first power supply device 1 via the communication unit 19c (step S21).

The signal processing unit 19 in the master power supply mode having transmitted the source information receives the current information, the operating information and the abnormality information that are transmitted from the second power supply device 1 (step S22) and determines whether or not receiving thereof is successful (step S23).

Note that the communication unit 19c that performs the transmission at step S20 corresponds to a current information transmission unit while the communication unit 19c that performs the transmission at step S21 corresponds to an abnormality information transmission unit. Furthermore, the communication unit 19c that performs the reception at step S22 corresponds to a current information reception unit and an abnormality information reception unit.

If determining that the reception is unsuccessful due to no response from the second power supply device 1 for a predetermined time period or longer (step S23: NO), the signal processing unit 19 stops operating the inverter 13 and calculating the PWM control information and the source information to thereby stop the output to the load 2 (step S24). Note that when the calculation of the PWM control information and the source information in the first power supply device 1 is stopped, the operation of the second power supply device 1 serving as a slave power supply is also stopped.

The signal processing unit 19 further notifies the main control unit 18 of communication abnormality while the main control unit 18 causes the operation panel 10 to display the presence of abnormality concerning communication (step S25) and ends the processing.

It is noted that the communication abnormality occurs when the power supply device 1 to be operated as a slave power supply is erroneously operated in the master power supply mode as well as at a time of a disconnection of a communication line or faulty connection of a connector.

If determining that the reception of the current information, the operating information and the abnormality information is successful by receiving a response from the second power supply device 1 (step S23: YES), the signal processing unit 19 determines whether or not the current indicated by the received current information is less than a predetermined threshold (step S26). It is noted that the signal processing unit 19 that performs the determination at step S26 corresponds to a determination unit.

If determining that the current is equal to or more than the threshold (step S26: NO), the signal processing unit 19 determines whether or not the state of the second power supply device 1 is abnormal based on the received abnormality information (step S27). For example, the signal processing unit 19 determines that abnormality occurs if the abnormality information indicates that the inverter 13 of the second power supply device 1 is in a stopped state, or if the abnormality information indicates abnormality such as overcurrent or the like.

If determining that current is less than the threshold (step S26: YES), or determining that abnormality occurs in the second power supply device 1 (step S27: YES), the signal processing unit 19 stops the operation of the inverter 13 and the calculation of the PWM control information and the source information to thereby stop the output to the load 2 (step S28). The signal processing unit 19 further notifies the main control unit 18 of an abnormal state, and the main control unit 18 causes the operation panel 10 to display that abnormality occurs in the slave power supply (step S29) and ends the processing.

If determining that the second power supply device 1 normally operates (step S27: NO), the main control unit 18 detects the current and voltage that are being output from its own device to the load 2 by the current detection unit 17 and the voltage detection unit 16, respectively (step S30). The main control unit 18 then sums the current obtained through detection by its own device and the current indicated by the current information received from the second power supply device 1 (step S31). The signal processing unit 19 then calculates PWM control information and source information based on the current obtained by the summation at step S31 and the voltage detected by its own device (step S32). The PWM control information calculated here is based on the current and voltage output from the overall power supply system to the load 2 and is information capable of controlling the output from the overall power supply system. Furthermore, the source information is information being a source for calculating the PWM control information.

Subsequently, the main control unit 18 causes the current display portion 10a to display the current value calculated at step S31 and causes the voltage display portion 10b to display the voltage value detected at step S30 as illustrated in FIG. 6A (step S33).

Meanwhile, the main control unit 18 transmits information for controlling the welding machine, for example, a wire feeding control signal for controlling the feeding of the welding wire 21, from the control terminal 1c to the welding machine (step S34). The wire feeding control signal is, for example, a signal for controlling the feeding velocity of the welding wire 21, the start and stop of feeding thereof and the like.

Next, the main control unit 18 determines whether or not the input of the driving instruction signal continues (step S35). If determining that no driving instruction signal is input (step S35: NO), the main control unit 18 stops the output to the load 2 by stopping the control of the inverter 13 by the signal processing unit 19 (step S36) and ends the processing. If determining that a driving instruction signal is input (step S35: YES), the main control unit 18 returns the processing to step S13 and continues to control the power feeding to the load 2.

In the power supply system thus configured, the first power supply device 1 serving as a master power supply obtains current information from the second power supply device 1 serving as a slave power supply and calculates PWM control information for controlling the output from each of the power supply devices 1 and source information. The first power supply device 1 then transmits the calculated source information to the second power supply device 1, and the power supply device 1 serving as a slave power supply controls the output based on the source information calculated on the master power supply side. Accordingly, in the power supply system according to Embodiment 1, the power supply devices 1 share the total current and target current in the whole system, to synchronize output control, allowing for stable control of current output from each of the power supply devices 1 to the load 2 and achieving welding control similarly to that achieved by a single power supply.

Furthermore, the user may confirm the information about the current and voltage that are being output from the power supply system to the load 2 by using the current display portion 10a and the voltage display portion 10b of the first power supply device serving as a master power supply.

In addition, the user may be free from unnecessary confusion by displaying predetermined information on the current display portion 10a and the voltage display portion 10b of the second power supply device 1 operating as a slave power supply.

Moreover, in the case where the first power supply device 1 serving as a master power supply cannot receive the current information that is supposed to be transmitted from the slave power supply, it stops the entire power system assuming that abnormality occurs in the communication with the second power supply device 1 serving as a slave power supply to thereby ensure safety.

Furthermore, in the case where the current output from the second power supply device 1 serving as a slave power supply is less than a threshold though the first power supply device 1 serving as a master power supply outputs current from itself, the first power supply device 1 stops the entire power supply system assuming that abnormality occurs in the second power supply device 1, so that the safety is ensured.

Additionally, if abnormality occurs in the operating state of the second power supply device 1 serving as a slave power supply, the first power supply device 1 serving as a master power supply stops the entire power supply system, so that the safety is ensured.

In addition, by stopping the power supply system upon these abnormalities, the power supply system may be maintained.

Moreover, the power supply device 1 according to Embodiment 1 may function as either one of the master power supply and the slave power supply by operating the operation portion 10c. Thus, even if the master power supply that constitutes the power supply system fails, the operating mode of the power supply device 1 functioning as a slave power supply is switched to the master power supply mode to thereby enable easy reconstruction of the power supply system.

Furthermore, the power supply device 1 according to Embodiment 1 may also function as a single power supply by the operation portion 10c being operated.

While an example where the source information includes total current output from the power supply system to the load 2 and target current for the total current is described, the representation manner of this information is not limited if calculation of the PWM control information is allowed. For example, the difference between the target current and the total current may be transmitted from the first power supply device 1 to the second power supply device 1 as source information. Moreover, in some embodiments, the average of the current output from the power supply devices 1, the number of power supply devices 1 connected in parallel to the load 2 and the target current may be transmitted to the second power supply device 1 as source information.

While an example of the two power supply devices 1 connected in parallel to the common load 2 is mainly described, three or more power supply devices 1 may also be used to form a power supply system.

Additionally, an example where the load 2 is used for arc welding is described, though it may also be used for a power supply system for supplying power to a load concerning an arc disconnection and other loads requiring large current.

In addition, the power supply system according to Embodiment 1 may output large current to an arc welding machine.

While description is made on the example where an isolation transformer typed switching power supply is subject to PWM control in Embodiment 1, the configuration and the control system of the power supply device 1 need not to be limited to particular ones, and known configuration and control system may be used. The known control system includes a pulse frequency modulation system as well as a pulse width modulation system, for example.

Furthermore, in Embodiment 1, description is made on an example where the entire power supply system is stopped if abnormality occurs in the power supply device 1 operating as a slave power supply. Such a configuration may, however, be made that power supply to the load 2 is continued if abnormality is trivial for the entire power supply system. For example, in the case where multiple slave power supplies are connected in parallel, and a disconnection relay or the like for disconnecting the power supply device 1 for which abnormality is found from the power supply system is provided, if required electric power may be supplied from the rest of the power supply devices 1, such multiple power supply devices 1 normally operating may continuously be operated.

Embodiment 2

The power supply system according to Embodiment 2 is different from Embodiment 1 in the transmission and reception timing of information such as source information, current information and the like, and thus the above-mentioned difference will mainly be described below. Embodiment 2 is similar to Embodiment 1 in the configuration and working effect, and thus corresponding parts are denoted by similar reference codes and detailed description thereof will not be repeated.

Figure 7:
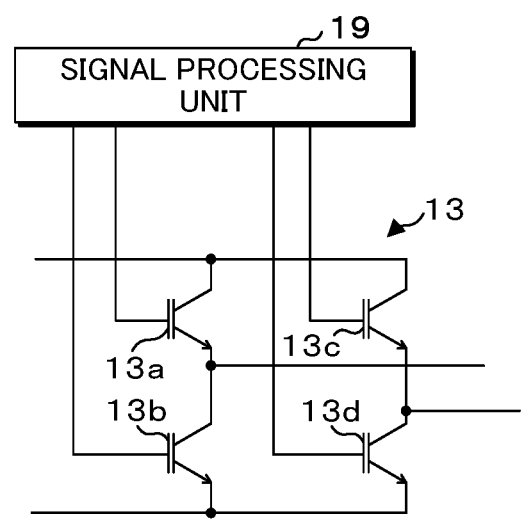
FIG. 7 is a circuit diagram illustrating one example of the configuration of an inverter.

FIG. 7 is a circuit diagram illustrating one example of the configuration of the inverter 13. The inverter 13 provided in the power supply device 1 has a circuit formed by two legs connected in parallel, one leg including a first switching element 13a and a second switching element 13b connected in series and the other leg including a third switching element 13c and a fourth switching element 13d connected in series. The first to fourth switching elements 13a, 13b, 13c and 13d are IGBTs, for example.

The gates of the first to fourth switching elements 13a, 13b, 13c and 13d are connected to the signal processing unit 19, and the signal processing unit 19 controls the operation of the inverter 13 by outputting a PWM signal (pulse signal) periodically switching between on and off to the gates of the first to fourth switching elements 13a, 13b, 13c and 13d.

Figure 8:
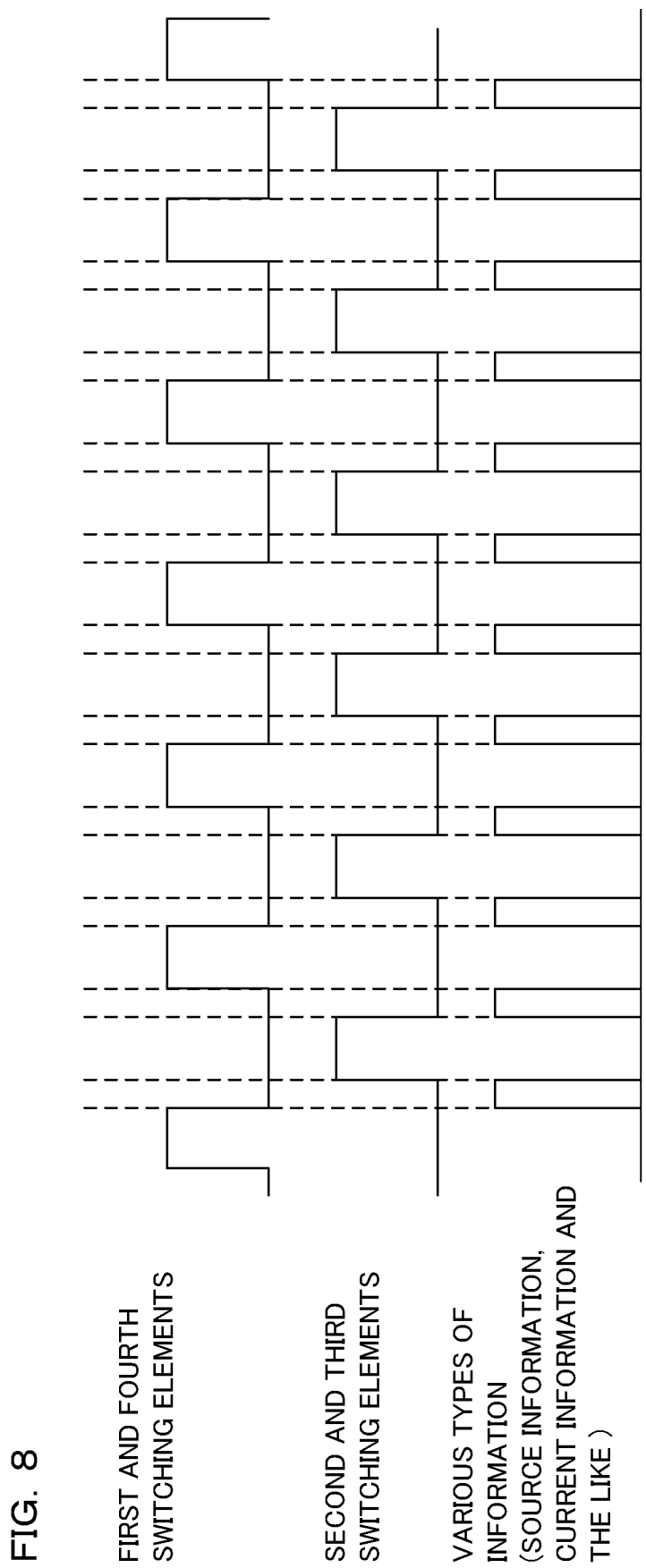
FIG. 8 is a timing chart illustrating the transmission timing of information.

FIG. 8 is a timing chart illustrating the transmission timing of information. The timing charts illustrated at the upper and the middle parts in FIG. 8 depict output timing of PWM signals output from the signal processing unit 19 to the inverter 13. The signal processing unit 19 causes the inverter 13 to output alternating current by alternately outputting an on-signal with a required pulse width according to the PWM control information to the first and fourth switching elements 13a and 13d and the second and third switching elements 13b and 13c.

The timing chart illustrated at the bottom part in FIG. 8 depicts transmission timing of various types of information transmitted by the first power supply device 1 and the second power supply device 1. More specifically, the signal processing unit 19 of the first power supply device 1 in the master power supply mode specifies the time period during which the first to fourth switching elements 13a, 13b, 13c and 13d of the inverter 13 are entirely turned off in the processing at step S14 illustrated in FIG. 4, and transmits the operating information indicating the operating state of the inverter 13 and the source information to the second power supply device 1 serving as a slave power supply via the communication unit 19c.

Similarly, the signal processing unit 19 of the second power supply device 1 in the slave power supply mode specifies the time period during which the first to fourth switching elements 13a, 13b, 13c and 13d of the inverter 13 are entirely turned off in the processing at step S20 illustrated in FIG. 4, and transmits the current information obtained by detection of its own device to the first power supply device 1 serving as a master power supply via the communication unit 19c. The signal processing unit 19 further specifies the time period during which the first to fourth switching elements 13a, 13b, 13c and 13d of the inverter 13 are entirely turned off in the processing at step S21 illustrated in FIG. 4, and transmits the operating information indicating the operating state of the inverter 13 of its own device and the abnormality information indicating the presence or absence of abnormality to the first power supply device 1 serving as a master power supply via the communication unit 19c.

According to the power supply system of Embodiment 2 thus configured, each of the power supply devices 1 is configured to transmit and receive source information during the off time period of the PWM signal, which prevents noise caused by the operation of the inverter 13 from being superimposed onto the source information. This makes it possible to improve communication stability among the power supply devices 1. Accordingly, it is possible to achieve both of the high-speed communication of the source information and improvement in communication stability.

Similarly, each of the power supply devices 1 is configured to transmit and receive current information required for calculating the PWM control information and the source information and various information during the off time period of the PWM signal, which prevents noise caused by the operation of the inverter 13 from being superimposed onto the PWM control information and makes it possible to improve communication stability among the power supply devices 1.

Embodiment 3

The power supply system according to Embodiment 3 is different from Embodiments 1 and 2 in that the communication mode of each of the power supply devices 1 is switched depending on the operating state, and each of the power supply devices 1 outputs a feeding control signal of the welding wire 21, and thus the above-mentioned differences will be mainly described below.

Embodiment 2 is similar to Embodiment 1 in the configuration and working effect, and thus corresponding parts are denoted by similar reference codes and detailed description thereof will not be repeated.

Figure 9:
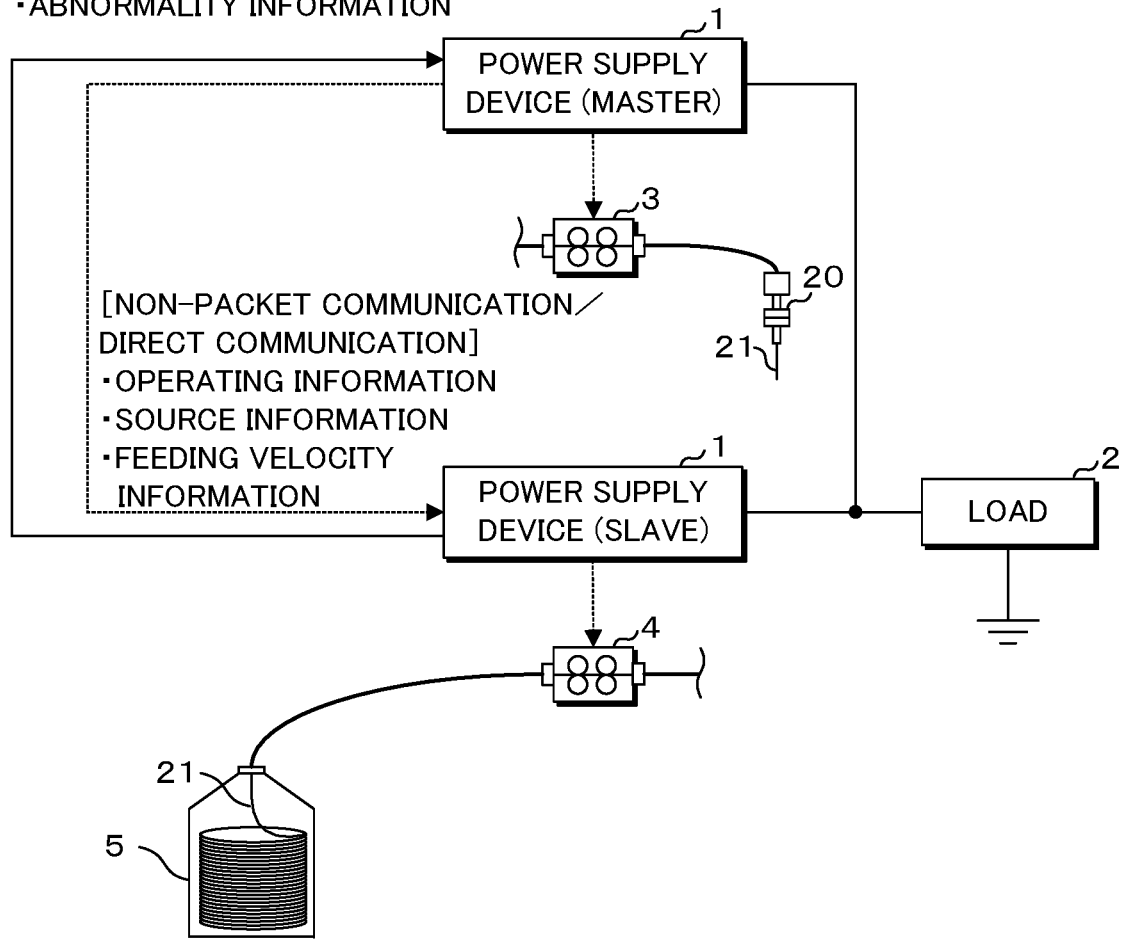
FIG. 9 is a block diagram conceptually illustrating a communication state during welding operation.
Figure 10:
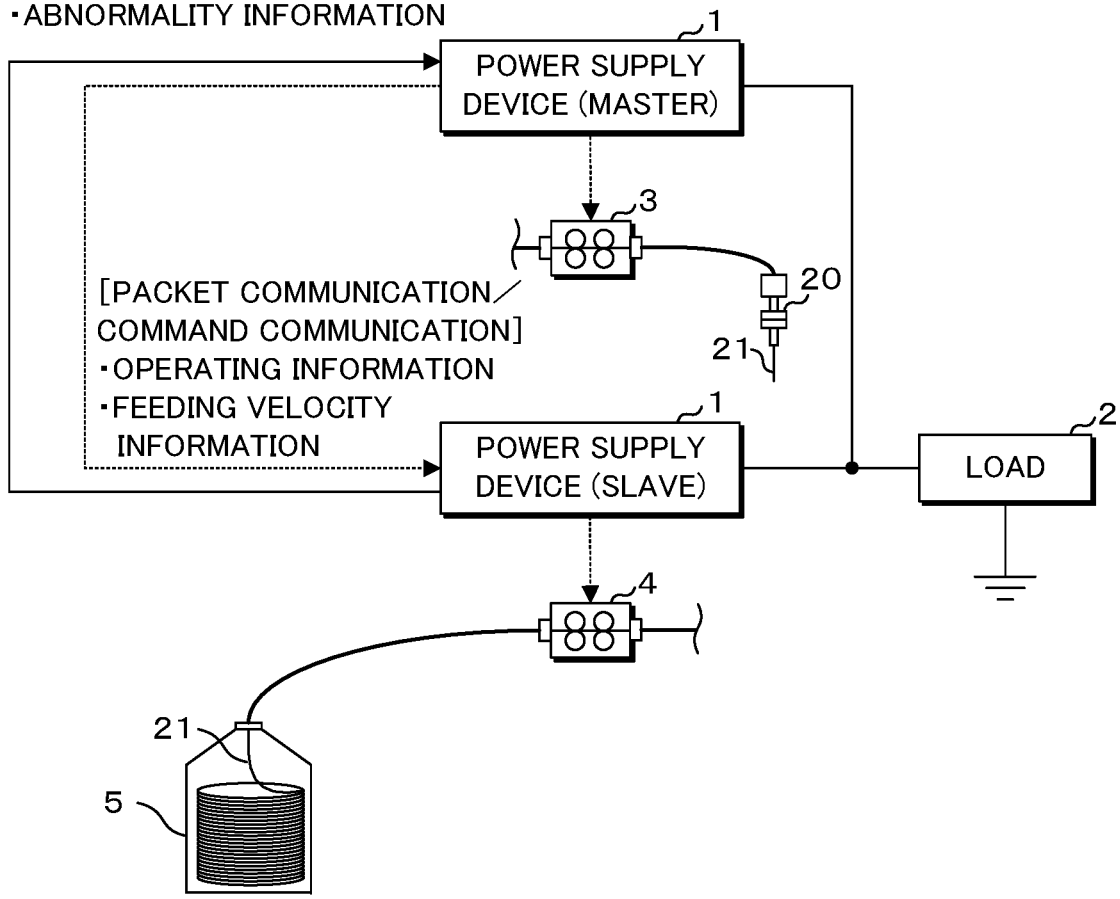
FIG. 10 is a block diagram conceptually illustrating a communication state during non-welding operation.

FIG. 9 is a block diagram conceptually illustrating a communication state during welding operation while FIG. 10 is a block diagram conceptually illustrating a communication state during non-welding operation. The welding machine includes a first feeding unit 3 and a second feeding unit 4 that each withdraw the welding wire 21 from the wire feeding source 5 and feed it to the welding torch 20. The first power supply device 1 and the second power supply device 1 output feeding control signals to the first feeding unit 3 and the second feeding unit 4, respectively. Note that, similarly to current output, the first power supply device 1 of the multiple power supply devices 1 functions as a master device for controlling feeding of the welding wire 21 by the second power supply device 1 by transmitting velocity information indicating the feeding velocity of the welding wire 21 to another power supply device 1 through a communication line. The second power supply device 1 functions as a slave that receives the velocity information transmitted from the first power supply device 1 and controls feeding of the welding wire 21 based on the received velocity information.

The wire feeding source 5 stores the welding wire 20 so as to be able to deliver the welding wire 21 toward the welding torch 20. The welding wire 21 is a solid wire, for example, and functions as a consumable electrode. The wire feeding source 5 is a pack wire stored in a pail pack in a spirally wound manner or a reel wire wound around a wire reel.

The first feeding unit 3 is disposed on the welding torch 20 side and has a pair of rollers that are opposite at a position where the welding wire 21 can be nipped therebetween. At least one of the rollers is rotatably driven by a motor. The first feeding unit 3 is connected to the first power supply device, and the power supply device 1 controls feeding of the welding wire 21 by the first feeding unit 3 by outputting a wire feeding control signal to the first feeding unit 3. The wire feeding control signal is a signal indicating the feeding velocity of the welding wire 21, that is, the rotation speed of the rollers and for controlling the feeding velocity of the welding wire 21. Furthermore, during the welding operation, the first power supply device 1 transmits feeding velocity information indicating the feeding velocity of the welding wire 21 together with operating information and source information to the second power supply device 1.

During welding operation, as illustrated in FIG. 9, the feeding velocity information, the operating information and the source information are transmitted to the second power supply device 1 as predetermined amount data, for example, 32-bit data through non-packet communication. That is, the power supply device 1 transmits and receives information in the direct communication mode.

Meanwhile, during non-welding operation, for example, inching operation for delivering the welding wire 21, the first power supply device 1 transmits feeding velocity information indicating the feeding velocity of the welding wire 21 together with the operating information to the second power supply device 1 as illustrated in FIG. 10. During the non-welding operation, the feeding velocity information and the operating information are transmitted to the second power supply device 1 through packet communication. That is, the power supply device 1 transmits and receives information in the command communication mode.

The second feeding unit 4 is disposed on the wire feeding source 5 side and has a pair of rollers that are opposite at a position where the welding wire 21 can be nipped therebetween. At least one of the rollers is rotatably driven by a motor. The second feeding unit 4 is connected to the second power supply device 1, and the power supply device 1 controls feeding of the welding wire 21 by the second feeding unit 4 by outputting a wire feeding control signal to the second feeding unit 4.

Especially in the case of the welding operation, the second power supply device 1, as illustrated in FIG. 9, receives the feeding velocity information, the operating information and the source information that are transmitted through non-packet communication from the first power supply device 1 and controls the feeding of the welding wire 21 by the second feeding unit 4 by outputting a wire feeding control signal according to the received feeding velocity information to the second feeding unit 4.

Meanwhile, in the case of the non-welding operation, the second power supply device 1, as illustrated in FIG. 10, receives the feeding velocity information and the operating information that are transmitted through packet communication from the first power supply device 1 and controls the feeding of the welding wire 21 by the second feeding unit 4 by outputting a wire feeding control signal according to the received feeding velocity information to the second feeding unit 4.

Note that a buffer temporarily storing the welding wire 21 may be disposed between the first feeding unit 3 and the second feeding unit 4 as necessary.

Figure 11:
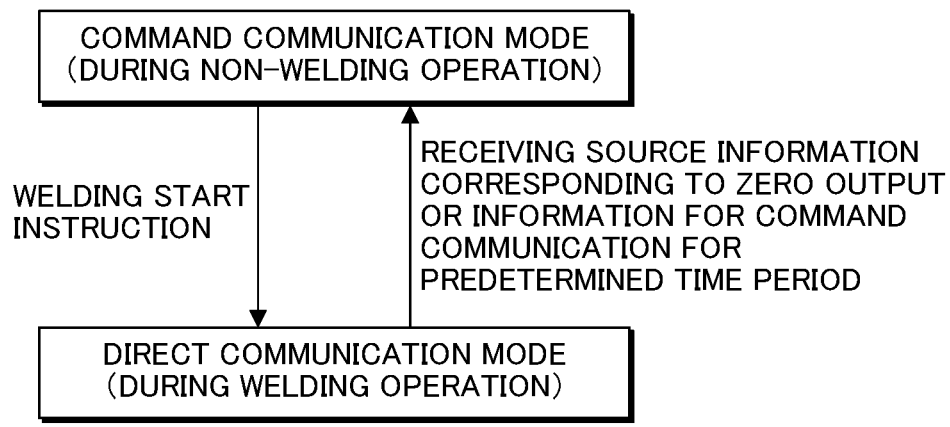
FIG. 11 is a transition diagram conceptually illustrating a method of switching a communication mode on a slave side.

FIG. 11 is a transition diagram conceptually illustrating a method of switching a communication mode on the slave side. The power supply device 1 on the master side switches the communication mode of information between the command communication mode and the direct communication mode depending on the presence or absence of an input of a driving instruction signal. More specifically, the first power supply device 1 selects the direct communication mode during the welding operation and selects the command communication mode during the non-welding operation. The second power supply device 1 is switched to the same communication mode as the first power supply device 1 depending on the state of communication with the first power supply device 1.

More specifically, during the non-welding operation during which no current concerning welding is output, the first power supply device 1 and the second power supply device 1 select the command communication mode to transmit and receive information. The first power supply device 1 and the second power supply device 1 transmit and receive the feeding velocity information to and from each other through packet communication to control the velocity of the first feeding unit 3 and the second feeding unit 4, executing inching or the like of the welding wire 21.

If a driving instruction signal is input to the first power supply device 1 during the non-welding operation, the power supply device 1 transmits a welding start instruction or a communication mode switching request to the second power supply device 1 through packet communication. If receiving the welding start instruction or the communication mode switching request, the second power supply device 1 transmits a response signal indicating reception of the instruction to the first power supply device 1 and switches the communication mode to the command communication mode. If receiving the response signal from the second power supply device 1 in response to the welding start instruction, the first power supply device 1 switches the communication mode to the command communication mode.

Hereafter, during the welding operation, the first power supply device 1 and the second power supply device 1 transmit and receive various types of information in the direct communication mode. More specifically, the operating information, the source information, the feeding velocity information and the like are transmitted and received as 32-bit data.

If there is no input of a driving instruction signal, that is, if the welding operation is stopped, the first power supply device 1 transmits the source information corresponding to zero output to the second power supply device 1 through non-packet communication and switches the communication mode to the command communication mode. The source information corresponding to zero output is information capable of calculating the PWM control information of a duty ratio of zero. If receiving the source information corresponding to zero output or the information about the command communication mode for 20 milliseconds or longer, for example, the second power supply device 1 actively switches the communication method to the command communication mode. Accordingly, the first power supply device 1 and the second power supply device 1 can switch their communication modes to the command communication mode at the end of welding.

The power supply device 1 according to Embodiment 3 thus configured can transmit and receive information through the non-packet communication, that is, in the direct communication mode during welding operation requiring high-speed communication and can transmit and receive various types of information through the packet communication, that is, in the command communication mode during non-welding operation not requiring high-speed communication.

Moreover, the first power supply device 1 and the second power supply device 1 can surely switch their communication modes at the beginning and end of welding operation.

Embodiment 4

The power supply system according to Embodiment 4 is different from that in Embodiments 1 to 3 in that the PWM control information is corrected in order to reduce variation of output due to variation of the machine properties, and therefore the difference will mainly be described below. Embodiment 4 is similar to Embodiments 1 to 3 in the configuration and working effect other than the difference, and corresponding parts are denoted by similar reference codes and detailed description thereof will not be repeated.

Figure 12:
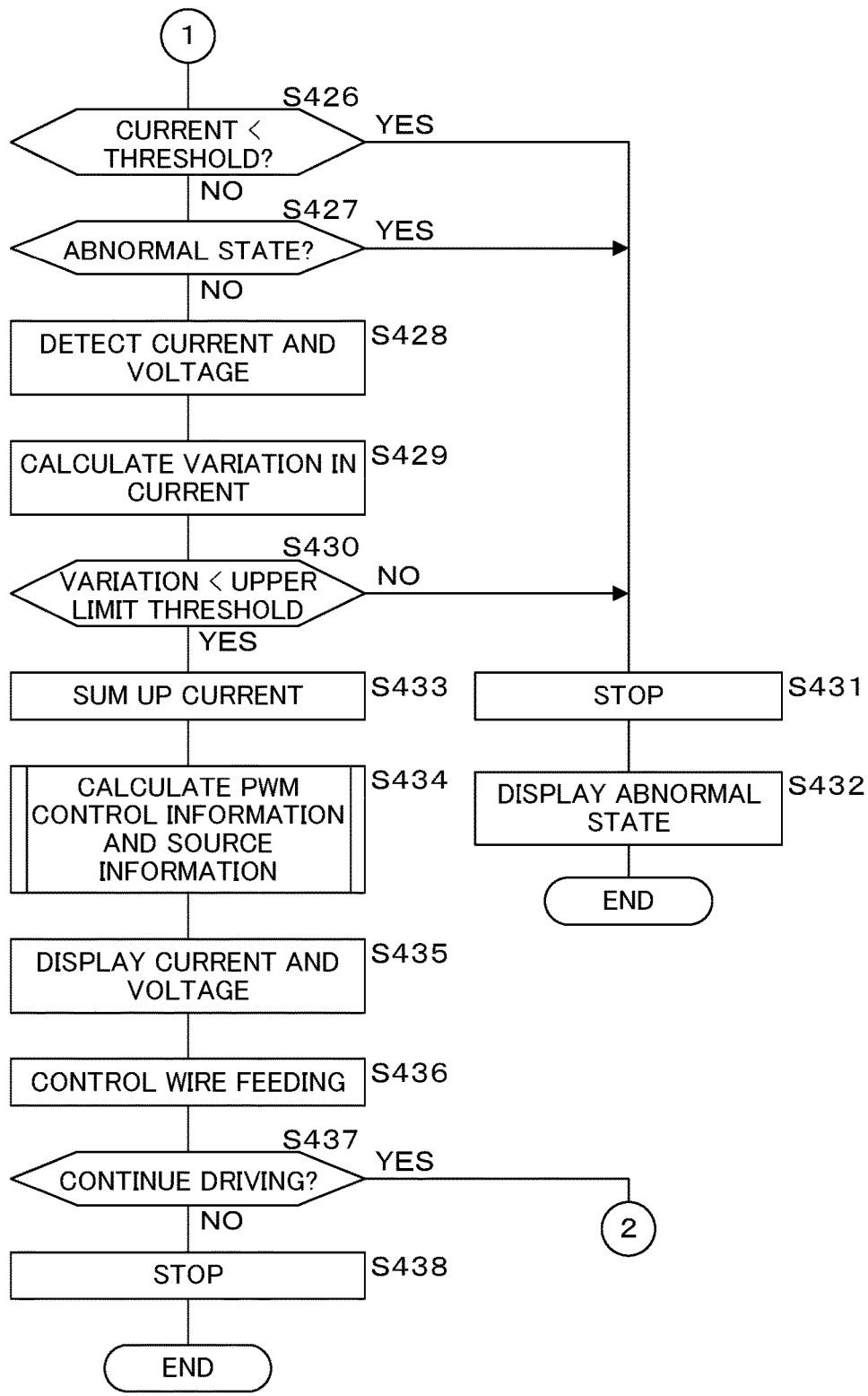
FIG. 12 is a flowchart illustrating the processing procedure of each of the power supply devices concerning power feeding control in Embodiment 4.

FIG. 12 is a flowchart illustrating the processing procedure of each of the power supply devices 1 concerning power feeding control in Embodiment 4. The first power supply device 1 and the second power supply device 1 execute the processing at steps S11 to S25 in FIG. 4 described in Embodiment 1 and execute the processing at step S426 onward illustrated in FIG. 12 if determining that the reception of the current information and the like is successful at step S23. The details of the processing at step S11 to step S25 are similar to those in Embodiment 1 except for the processing at steps S14 and S16, and thus the detailed description will not be made. The details of the processing at step S14 concerning transmission of source information and the processing at step S16 concerning calculation and correction of PWM control information will be described later.

If receiving a response from the second power supply device 1 and determining that the receptions of the current information, the operating information and the abnormality information are successful (step S23: YES), the signal processing unit 19 determines whether or not the current indicated by the received current information is less than a predetermined threshold (step S426).

If determining that the current is equal to or more than the threshold (step S426: NO), the signal processing unit 19 determines whether or not the state of the second power supply device 1 is abnormal based on the received abnormality information (step S427). For example, the signal processing unit 19 determines that abnormality occurs if the abnormality information indicates a stopped state of the inverter 13 of the second power supply device 1, or if the abnormality information indicates abnormality such as overcurrent or the like.

If determining that the second power supply device 1 normally operates (step S427: NO), the signal processing unit 19 detects the current and voltage that are being output from its own device to the load 2 by the current detection unit 17 and the voltage detection unit 16, respectively (step S428). More specifically, the main control unit 18 respectively detects the current and voltage that are being output from its own device to the load 2 by the current detection unit 17 and the voltage detection unit 16, and outputs the detected current information and voltage information to the signal processing unit 19. The signal processing unit 19 obtains the current information and voltage information that are output from the main control unit 18.

Note that the signal processing unit 19 stores the detected current and voltage, and accumulates information concerning at least current over a period of several milliseconds to several tens of milliseconds. The signal processing unit 19 then calculates a variation in current detected by the power supply devices 1 (step S429) and determines whether or not the variation in current is less than a predetermined upper limit threshold (step S430). If the first power supply device 1 and the second power supply device 1 are connected in parallel, the variation corresponds to, for example, the difference between the current detected by the first power supply device 1 and the current calculated by the second power supply device 1. Alternatively, the difference between the moving average values of the current calculated by the first power supply device 1 and the current calculated by the second power supply device 1 may be calculated as the variation. If three or more power supply devices 1 are connected in parallel, the variation may be represented by standard deviation of the current detected by each power supply device 1, the difference between the maximum value and the minimum value of the current, the difference between the average value and the maximum value of the current, or the like.

If determining that current is less than the threshold (step S426: YES), determining that abnormality occurs in the second power supply device 1 (step S427: YES), or determining that the variation in current is equal to or more than the upper limit threshold (step S430: NO), the signal processing unit 19 stops the operation of the inverter 13 and the calculation of the PWM control information to thereby stop the output to the load 2 (step S431). The signal processing unit 19 further notifies the main control unit 18 of an abnormal state while the main control unit 18 causes the operation panel 10 to display that abnormality occurs in the power supply (step S432), and ends the processing.

If determining that the variation in current is less than the upper limit threshold (step S430: YES), the main control unit 18 sums the current obtained by detection in its own device and the current indicated by the current information received from the second power supply device 1 (step S433). The signal processing unit 19 then calculates PWM control information and source information based on the current obtained by the summation at step S433 and the voltage detected by its own device (step S434). The PWM control information calculated here is based on the current and voltage output from the overall power supply system to the load 2 and is information capable of controlling the output from the overall power supply system. Furthermore, the PWM control information calculated by the processing at step S434 is information basically common to the power supply devices 1 while the PWM control information is corrected based on the variation of the current actually output from the power supply devices 1 to the load 2. More specifically, the PWM control information is corrected such that current output from the power supply devices 1 to the load 2 is equalized. The details of the correction of the PWM control information will be described later.

Subsequently, the main control unit 18 causes the current display portion 10a to display the current value calculated at step S433 and causes the voltage display portion 10b to display the voltage value detected at step S27 (step S435).

Meanwhile, the main control unit 18 transmits information for controlling the welding machine, for example, a wire feeding control signal for controlling the feeding of the welding wire 21 from the control terminal 1c to the welding machine (step S436).

Next, the main control unit 18 determines whether or not the input of the driving instruction signal continues (step S437). If determining that no driving instruction signal is input (step S437: NO), the main control unit 18 stops the signal processing unit 19 controlling the inverter 13 to thereby stop the output to the load 2 (step S438) and ends the processing. If determining that a driving instruction signal is input (step S437: YES), the main control unit 18 returns the processing to step S13 (see FIG. 4) and continues to control the power feeding to the load 2.

Figure 13:
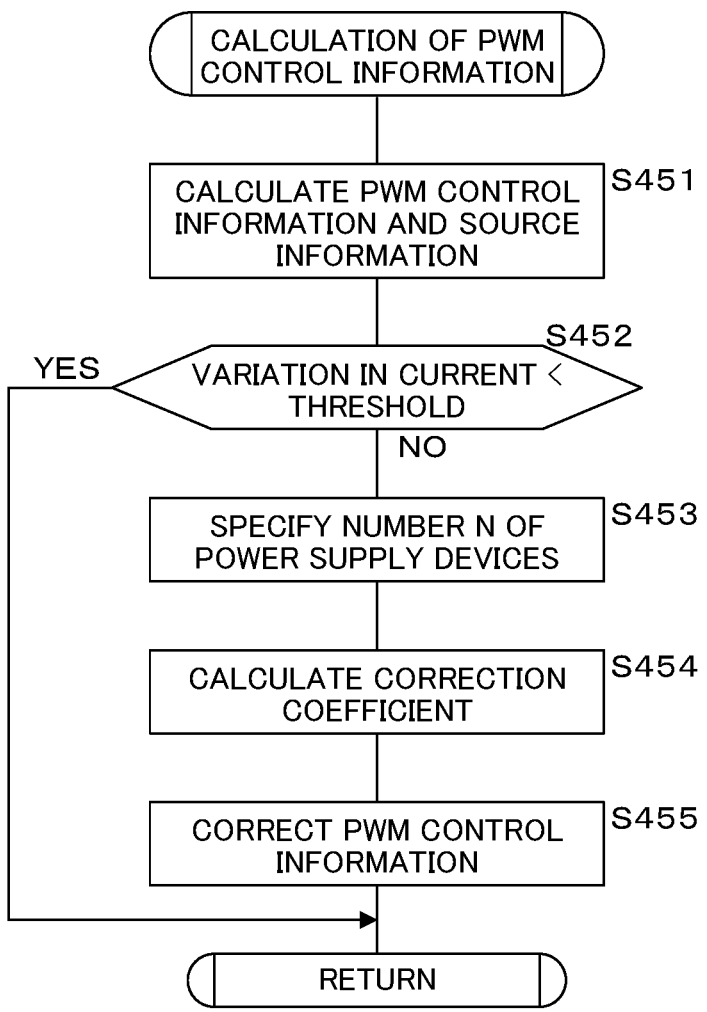
FIG. 13 is a flowchart illustrating the processing procedure concerning the calculation and correction of PWM control information, etc.

FIG. 13 is a flowchart illustrating the processing procedure concerning the calculation and correction of PWM control information. The signal processing unit 19 then calculates the PWM control information and the source information common to the power supply devices 1 based on the current obtained by the above-mentioned summation at step S433 and the voltage detected by its own device assuming that the power supply devices 1 other than first power supply device 1 have a characteristic the same as that of the first power supply device 1 (step S451).

Next, the signal processing unit 19 determines whether or not a variation in current detected by the power supply devices 1 is less than a predetermined threshold (step S452). The variation in current is the same as that calculated at step S429. If determining that the variation in current is less than the predetermined threshold (step S452: YES), the signal processing unit 19 ends the subroutine processing without correcting the PWM control information and returns the processing to step S434.

If determining that the variation in current is equal to or more than the threshold (step S452: NO), the signal processing unit 19 specifies the number N of power supply devices 1 connected in parallel (step S453). Subsequently, the signal processing unit 19 calculates a correction coefficient for correcting the PWM control information of the power supply device 1 of its own (step S454). The PWM control information corrected here is, for example, a duty ratio, and the correction coefficient is represented by the following formula (3). Note that the constant G defines the relation between the variation in current and the corrected amount of the duty ratio. It is assumed that the variable n=1 represents the first power supply device 1.

$$Pn = 1 + Gx(\Sigma I - N \times In)/\{(N-1) \times \Sigma I\} \quad (3)$$

where n: a variable representing each of the power supply devices 1 connected in parallel;
N: the number of power supply devices 1 connected in parallel;
Pn: correction coefficient;
In=I1, I2, . . . IN; current detected by each of the power supply devices 1;
ΣI=I0+I1+ . . . +IN: the total sum of the current detected by the power supply devices 1; and
G: constant.

Note that the current I1, I2, . . . IN detected by each of the power supply devices 1 may have one detection value or a moving average of the current detected multiple times over a predetermined time period for each power supply device 1. For example, if obtaining and accumulating current of each of the power supply devices 1 at every several tens of microseconds, the signal processing unit 19 may calculate the moving average of the current of each of the power supply devices 1 by using current values accumulated over several milliseconds to several tens of milliseconds and may calculate the correction coefficient Pn by using the moving average of the current.

The above-mentioned formula (3) is one example of the calculation formula of the correction coefficient Pn. Any formula may be employed if it is possible to calculate a coefficient capable of correcting the PWM control information such that current output from the power supply devices 1 is equalized. For example, the correction coefficient Pn represented by the above-mentioned formula (3) is a coefficient increasing or decreasing in proportion to the difference of the current output from the power supply devices 1, but it may be a coefficient increasing or decreasing nonlinearly. Furthermore, the correction coefficient may be a coefficient increasing or decreasing in proportion to the time integration, time derivative or the like of the above-described difference.

The signal processing unit 19 that has calculated the correction coefficient Pn corrects the PWM control information by multiplying the duty ratio concerning the power supply device 1 corresponding to the variable n by the correction coefficient Pn (step S455), ends the subroutine processing, and returns the processing to step S434.

FIG. 13 illustrates correction of PWM control information in the first power supply device 1 though correction of PWM control information may similarly be made in the second power supply device 1. More specifically, the signal processing unit 19 in the first power supply device 1 transmits source information and operating information including information for correcting PWM control information in addition to information for obtaining the PWM control information to the second power supply device 1 serving as a slave power supply through the communication unit 19c at step S14. The information for correcting the PWM control information is, for example, the constant G, the total sum of the current ΣI, the number of power supply devices 1 connected in parallel N and the like. Note that if no correction of the PWM control information is required, information indicating that no correction is required, source information including the constant G=0 or the like may be transmitted.

The signal processing unit 19 in the second power supply device 1 receives the above-described source information transmitted from the first power supply device 1. The signal processing unit 19 executes processing of calculating PWM control information based on the received source information and of correcting the PWM control information obtained by calculation. The method of calculating the correction coefficient Pn and the method of correcting the PWM control information are similar to those in the above-described processing at step S434. Note that if the source information includes information indicating that no correction of the PWM control information is required, the signal processing unit 19 does not perform the correction.

If two power supply devices 1 are connected in parallel, the above-described formula (3) is represented by the formulas (4) and (5) below. The signal processing unit 19 in the first power supply device 1 calculates a correction coefficient P1 and multiplies a PWM control signal by the correction coefficient P1 to thereby correct the PWM control signal. Likewise, the signal processing unit 19 in the second power supply device 1 calculates a correction coefficient P2 and multiplies a PWM control signal by the correction coefficient P2 to thereby correct the PWM control signal.

$$P1 = 1 + G^*(I2 - I1)/(I1 - I2) \quad (4)$$

$$P2 = 1 + G^*(I1 - I2)/(I1 - I2) \quad (5)$$

Note that in the description above, an example where the constant G or the like for calculating the correction coefficient Pn is transmitted to the second power supply device 1, though the correction coefficient Pn to be multiplied by the PWM control information in the second power supply device 1 may be calculated in the first power supply device 1, and the calculated correction coefficient Pn may be transmitted to the second power supply device 1 in such a manner as to be included in the source information.

In the power supply system thus configured, the first power supply device 1 serving as a master power supply obtains current information from the second power supply device 1 serving as a slave power supply and calculates PWM control information for controlling the output from each of the power supply devices 1 and source information. The first power supply device 1 corrects the PWM control information of the first power supply device 1 of itself such that current output from the first power supply device 1 and the second power supply device 1 to the load 2 are equalized. The first power supply device 1 controls the output based on the corrected PWM control information of itself. Similarly, the second power supply device 1 serving as a slave power supply calculates PWM control information based on the received source information, corrects the PWM control information in a similar manner and controls the output based on the corrected PWM control information. Accordingly, in the power supply system according to Embodiment 4, current output from the power supply devices 1 to the load 2 can be corrected so as to be equalized even if there is a variation in the machine properties of the power supply devices 1, which achieves responsiveness and stable control equivalent to a single power supply similarly to Embodiments 1 to 3.

Furthermore, since the first power supply device 1 is configured to correct the PWM control information only when current output from the power supply devices 1 to the load 2 varies widely, current may stably be controlled such that current from the power supply devices 1 is equalized while the time variation of the current output from the power supply devices 1 to the load 2 is reduced.

Moreover, in the case where the variation in current output from the power supply devices 1 is equal to or more than the upper limit threshold, the overall power supply system may be stopped to thereby ensure safety. For example, in the case where abnormality occurs that is uncontrollable by the balance control of the current such as a disconnected state of the power cable or the like as well, safety concerning the power supply system may be ensured.

Additionally, the power supply device 1 may correct the PWM control information such that the variation in current output from the power supply device 1 is reduced with simple processing of multiplying the duty ratio of the PWM control information for controlling the operation of each of the power supply devices 1 by the correction coefficient Pn.

Embodiment 5

Figure 14:
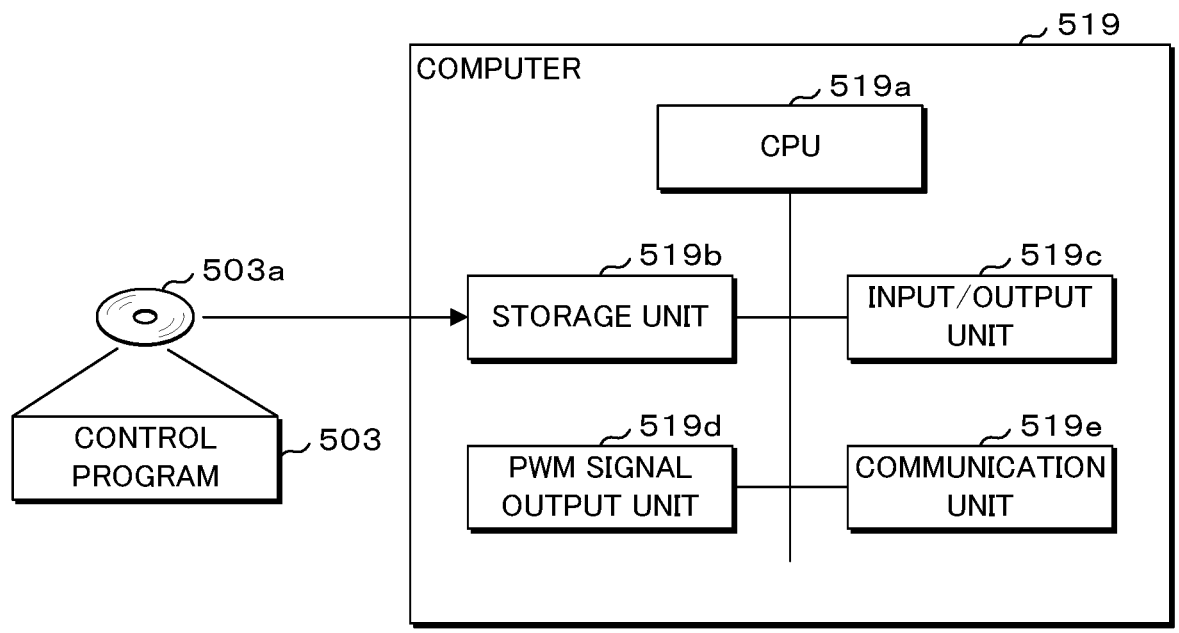
FIG. 14 is a block diagram illustrating one example of the configuration of a signal processing circuit in Embodiment 5.

FIG. 14 is a block diagram illustrating one example of the configuration of an image processing circuit according to Embodiment 5. A power supply device according to Embodiment 5 is different from those in Embodiments 1 to 4 in the configuration of a signal processing unit 519, and thus the above-mentioned difference will mainly be described below. Embodiment 5 is similar to Embodiments 1 to 4 in the configuration and working effect other than the difference, and corresponding parts are denoted by similar reference codes, and detailed description thereof will not be repeated. While an example where the calculation and correction of the PWM control information is performed hardware-wise by the DSP being a dedicated circuit is described in Embodiments 1-4, an example where the calculation and correction of the PWM control information is performed software-wise by the signal processing unit 519 is described in Embodiment 5.

The signal processing unit 519 is a computer having a CPU 519a, for example. The CPU 519a is connected to a storage unit 519b, an input/output unit 519c, a PWM signal output unit 519d and a communication unit 519e via a bus. The CPU 519a of the signal processing unit 519 executes a control program 503, which will be described below, stored in the storage unit 519b to thereby execute processing of calculating and correcting the PWM control information and controlling the operation of the power supply devices 1.

The storage unit 519b includes a nonvolatile memory such as a RAM or the like and a nonvolatile memory such as an electrically erasable programmable (EEP) ROM, a flash memory or the like. The storage unit 519b stores the control program 503 for executing control concerning calculation and correction of the PWM control information to control the current and voltage to be output from each of the power supply devices 1. It is noted that the control program 503 may be computer-readably recorded in a recording medium 503a. The storage unit 519b stores the control program 503 read out from the recording medium 503a by a reading device (not illustrated). The recording medium 503a is an optical disk such as a compact disc (CD)-ROM, a digital versatile disc (DVD)-ROM, a blue-ray (registered trademark) disc (BD) or the like, a magnetic disk such as a flexible disk, a hard disk or the like, a magnetooptical disk, a semiconductor memory and so on. Furthermore, the control program 503 concerning Embodiment 1 may be downloaded from an external computer (not illustrated) connected to a communication network (not illustrated) and may be stored in the storage unit 519b.

The input/output unit 519c is connected to the main control unit 18, and the CPU 519a inputs and outputs various signals via the input/output unit 519c.

The communication unit 519e is a communication circuit for transmitting and receiving various types of information to and from another power supply device 1, and the CPU 119a transmits and receives various types of information to and from another power supply device 1 via the communication unit 519e.

The PWM signal output unit 519d is connected to the inverter 13, and the CPU 519a outputs a PWM signal to the inverter 13 via the PWM signal output unit 119d according to the calculated and corrected PWM control information.

The details of the processing performed by the signal processing unit 519 executing the control program 503 are similar to those depicted in Embodiments 1-4.

Even in the power supply system thus configured in Embodiment 5, a similar effect to the power supply system described in Embodiments 1 to 4 described above may be exhibited.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A power supply system comprising a first power supply device and a second power supply device connected in parallel to a common load,
   wherein the first power supply device includes
      a signal processor that calculates control information for controlling voltage or current to be output to the load from the first power supply device and source information for obtaining a control information for controlling voltage or current to be output to the load from the second power supply device, and controls voltage or current to be output to the load based on the control information,
      a current detection circuit that detects current output from the first power supply device to the load;
      a voltage detection circuit that detects voltage output from the first power supply device to the load, and
      a communication circuit that transmits the source information calculated by the signal processor to the second power supply device;
   wherein the second power supply device includes
      a communication circuit that receives the source information transmitted from the first power supply device,
      a signal processor that calculates control information for controlling voltage or current to be output to the load based on the source information received by the communication circuit, and controls voltage or current to be output to the load based on the control information, and
      a current detection circuit that detects current output from the second power supply device to the load;
   wherein the communication circuit of the second power supply device transmits current information indicating the current detected by the current detection circuit to the first power supply device;

wherein the communication circuit of the first power supply device receives the current information transmitted from the second power supply device;

wherein the signal processor of the first power supply device calculates control information for controlling voltage or current to be output to the load and source information for obtaining the control information, based on the current indicated by the current information received by the communication circuit, the current detected by the current detection circuit included in the first power supply device and the voltage detected by the voltage detection circuit included in the first power supply device;

wherein the first power supply device and the second power supply device each include a display for displaying an operating state of the device of itself, the display of the first power supply device displays current obtained by summing the current detected by the first power supply device and the current indicated by the current information received by the communication circuit of the first power supply and the voltage detected by the voltage detection circuit, and the display of the second power supply device displays predetermined information;

wherein the first power supply device and the second power supply device transmit and receive information to and from each other through packet communication if outputting no voltage or no current to the load, and transmit and receive information to and from each other through non-packet communication for transmitting and receiving a predetermined amount of data if outputting voltage or current to the load;

wherein the second power supply device transmits and receives information through the non-packet communication and switches a communication mode to the packet communication if the second power supply device does not receive the source information for a predetermined time period or longer, and wherein the first power supply device and the second power supply device supply power to a load concerning arc welding.

2. The power supply system according to claim 1, wherein the signal processor of the first power supply device stops operating the first power supply device if the communication circuit of the first power supply receives no current information.

3. The power supply system according to claim 1, wherein the signal processor of the first power supply device determines whether or not current indicated by the current information received by the communication circuit of the first power supply device is less than a predetermined threshold, and stops operating the first power supply device if the current is less than the threshold.

4. The power supply system according to claim 1, wherein the communication circuit of the second power supply device transmits abnormality information indicating presence or absence of abnormality for the second power supply device to the first power supply device, the communication circuit of the first power supply device receives the abnormality information transmitted from the second power supply device, and the signal processor of the first power supply device stops operating the first power supply device depending on the abnormality information received by the communication circuit of the first power supply device.

5. The power supply system according to claim 1, wherein the source information includes total current obtained by summing the current indicated by the current information received by the communication circuit of the first power supply device and the current detected by the current detection circuit included in the first power supply device and target current for the total current.

6. The power supply system according to claim 1, wherein the first power supply device and the second power supply device each include an inverter for controlling voltage or current to be output to the load, the signal processor of the first power supply device controls voltage or current to be output to the load by outputting a pulse signal to the inverter, and the communication circuit of the first power supply device transmits source information during an off time period of the pulse signal output by the signal processor.

7. The power supply system according to claim 6, wherein the communication circuit of the second power supply device transmits current information during the off time period of the pulse signal output by the signal processor.

8. The power supply system according to claim 1, wherein the signal processor of the first power supply device corrects the control information concerning the first power supply device such that current to be output from the first power supply device to the load and current to be output from the second power supply device to the load are equalized based on the current indicated by the current information received by the communication circuit of the first power supply device and the current detected by the current detection circuit included in the first power supply device, and the signal processor of the second power supply device corrects the control information concerning the second power supply device such that current to be output from the first power supply device to the load and current to be output from the second power supply device to the load are equalized based on the source information received by the communication circuit of the second power supply device.

9. A control method of a power supply system comprising a first power supply device and a second power supply device connected in parallel to a common load, comprising:

detecting current output from the first power supply device and current output from the second power supply device to the load, and voltage output from the first power supply device to the load, wherein the first power supply device calculates control information for controlling voltage or current to be output to the load from the first power supply device and source information for obtaining a control information for controlling voltage or current to be output to the load from the second power supply device, based on each detected current and detected voltage, transmits the calculated source information to the second power supply device and controls voltage or current to be output to the load from the first power supply device based on the calculated control information, and displays current obtained by summing the detected current output from the first power supply device with the detected current output from the second power supply device and the detected voltage output from the first power supply device, wherein the second power supply device receives the source information transmitted from the first power supply device, calculates control information for calculating control information for controlling voltage or current to be output to the load based on the received source information, controls voltage or current to be output to the load based on the calculated control information, and displays predetermined information;

wherein the first power supply device and the second power supply device transmit and receive information to and from each other through packet communication if outputting no voltage or no current to the load, and transmit and receive information to and from each other through non-packet communication for transmitting and receiving a predetermined amount of data if outputting voltage or current to the load;

wherein the second power supply device transmits and receives information through the non-packet communication and switches a communication mode to the packet communication if the second power supply device does not receive the source information for a predetermined time period or longer, and wherein the first power supply device and the second power supply device supply power to a load concerning arc welding.

* * * * *